United States Patent
Seki et al.

(10) Patent No.: US 12,285,716 B2
(45) Date of Patent: Apr. 29, 2025

(54) ADSORBENT, CANISTER, AND METHOD FOR PRODUCING ADSORBENT

(71) Applicants: Osaka Gas Chemicals Co., Ltd., Osaka (JP); Mahle International GmbH, Stuttgart (DE)

(72) Inventors: Kenji Seki, Osaka (JP); Koji Yamasaki, Tokyo (JP)

(73) Assignees: OSAKA GAS CHEMICALS CO., LTD. (JP); MAHLE INTERNATIONAL GMBH (DE)

( * ) Notice: Subject to any disclaimer, the term of this patent is extended or adjusted under 35 U.S.C. 154(b) by 1028 days.

(21) Appl. No.: 17/280,581

(22) PCT Filed: Sep. 24, 2019

(86) PCT No.: PCT/JP2019/037262
§ 371 (c)(1),
(2) Date: Nov. 1, 2021

(87) PCT Pub. No.: WO2020/067007
PCT Pub. Date: Apr. 2, 2020

(65) Prior Publication Data
US 2022/0040627 A1    Feb. 10, 2022

(30) Foreign Application Priority Data
Sep. 28, 2018 (JP) .................................. 2018-185497

(51) Int. Cl.
*B01D 53/04*    (2006.01)
*B01J 20/06*    (2006.01)
(Continued)

(52) U.S. Cl.
CPC .......... *B01D 53/0415* (2013.01); *B01J 20/06* (2013.01); *B01J 20/20* (2013.01); *B01J 20/267* (2013.01);
(Continued)

(58) Field of Classification Search
CPC ................ B01D 53/04; B01D 53/0407; B01D 2259/4516; B01D 2259/4566; B01J 20/20;
(Continued)

(56) References Cited

U.S. PATENT DOCUMENTS 5,260,035 A    11/1993 Lachman
5,356,852 A    10/1994 DeLiso et al.
(Continued)

FOREIGN PATENT DOCUMENTS

CN    103620203 A    3/2014
CN    104822931 A    8/2015
(Continued)

OTHER PUBLICATIONS

EESR dated May 3, 2022 in copending EP application No. EP19866737.0.
(Continued)

*Primary Examiner* — Minh T Pham
(74) *Attorney, Agent, or Firm* — Fishman Stewart PLLC

(57) ABSTRACT

An object of the present invention is to provide an adsorbent and a canister which can improve adsorption performance and purge performance. An adsorbent 10 to be packed in a canister includes:
a cylindrical outer wall 10A, and
a plurality of ribs 10B for partitioning along an axis of the outer wall 10A into a plurality of cells, wherein
the thickness dα of the outer wall 10A and the thickness dβ of the ribs 10B is less than 0.6 mm,
the thickness of at least either of the outer wall 10A and the ribs 10B exceeds 0.4 mm,
the outer diameter D of the outer wall 10A is 3.5 mm or more and 40 mm or less,
a BWC exceeds 3.0 g/dL, and
(Continued)

purge efficiency((amount of butane adsorbed−amount of butane retained)/amount of butane adsorbed) is more than 0.86 or more.

35 Claims, 4 Drawing Sheets

(51) Int. Cl.
*B01J 20/20* (2006.01)
*B01J 20/26* (2006.01)
*B01J 20/28* (2006.01)
*B01J 20/30* (2006.01)

(52) U.S. Cl.
CPC ..... *B01J 20/2803* (2013.01); *B01J 20/28045* (2013.01); *B01J 20/28071* (2013.01); *B01J 20/3007* (2013.01); *B01D 2253/102* (2013.01); *B01D 2253/304* (2013.01); *B01D 2253/306* (2013.01); *B01D 2253/308* (2013.01); *B01D 2257/702* (2013.01); *B01D 2259/4516* (2013.01); *B01D 2259/4566* (2013.01)

(58) Field of Classification Search
CPC ........... B01J 20/28; B01J 20/30; F02M 25/08; F02M 25/089; F02M 25/0854; B60K 2015/03514; B60K 15/03504
USPC .......................... 96/108, 146, 121, 130–133
See application file for complete search history.

(56) References Cited

U.S. PATENT DOCUMENTS

| | | | |
|---|---|---|---|
| 5,934,260 A | 8/1999 | Gadkaree et al. | |
| 7,981,834 B2 | 7/2011 | Goto | |
| 10,030,614 B1 | 7/2018 | Park | |
| 10,857,515 B2 | 12/2020 | Hitomi et al. | |
| 11,697,090 B2* | 7/2023 | Greenbank ...... | B60K 15/03504 96/153 |
| 11,697,091 B2* | 7/2023 | Greenbank .......... | B67D 7/0476 96/108 |
| 11,703,016 B2* | 7/2023 | Greenbank .............. | B01J 20/28 123/518 |
| 2005/0066817 A1 | 3/2005 | Wolff | |
| 2013/0263740 A1* | 10/2013 | Mani .................. | B01D 53/0407 96/112 |
| 2014/0124385 A1 | 5/2014 | Yamasaki et al. | |
| 2015/0184621 A1 | 7/2015 | Arase et al. | |
| 2015/0275727 A1 | 10/2015 | Hiltzik | |
| 2016/0169162 A1* | 6/2016 | Eguchi ............... | B01D 53/0415 96/146 |
| 2017/0274351 A1 | 9/2017 | Hitomi | |
| 2018/0178194 A1 | 6/2018 | Hasumi et al. | |
| 2019/0249624 A1 | 8/2019 | Seki | |
| 2021/0237030 A1 | 8/2021 | Seki | |
| 2023/0149846 A1* | 5/2023 | Minezawa ......... | B01D 53/0446 96/130 |
| 2023/0149847 A1* | 5/2023 | Iwamoto ............ | B01D 53/0446 96/130 |

FOREIGN PATENT DOCUMENTS

| | | |
|---|---|---|
| CN | 106794444 A | 5/2017 |
| CN | 108236920 A | 7/2018 |
| EP | 2728157 A1 | 5/2014 |
| JP | H04317405 A | 11/1992 |
| JP | 2007-117863 A | 5/2007 |
| JP | 2014-37790 A | 2/2014 |
| JP | 5867800 B2 | 2/2016 |
| JP | 2016-109090 A | 6/2016 |
| JP | 6203043 B2 | 9/2017 |
| JP | 2018-115578 A | 7/2018 |
| JP | 2018103100 A | 7/2018 |
| WO | 2015053815 A1 | 4/2015 |
| WO | 2016025305 A1 | 2/2016 |
| WO | 2016043049 | 3/2016 |
| WO | 20180079447 A1 | 1/2018 |
| WO | 2018079447 A1 | 5/2018 |
| WO | 2018140081 A1 | 8/2018 |
| WO | 2018236935 A1 | 12/2018 |
| WO | 2019208600 A1 | 10/2019 |

OTHER PUBLICATIONS

Miles A. Sakwa-Novak et al., "Poly(ethylenimine)—Functionalized Monolithic Alumina Honeycomb Adsorbents for $CO_2$ Capture from Air", Chemsuschem, vol. 9, No. 14, Jun. 15, 2016, pp. 1859-1868.
Steel Gary, "Honeycomb Activated Carbon—Activated Carbon", Acarbons.com, Jul. 31, 2017, pp. 1-7.
Japanese Office Action dated May 16, 2023 for copending Japanese App. No. 2020-549211 (w_English_translation).
Chinese Office Action dated May 22, 2023 for copending Chinese App. No. 201980078891.3 (w_English_translation).
Chinese Office Action dated Jan. 11, 2023 for copending Chinese App. No. 201980078891.3 (w_Eng_transl.) .
Chinese Search Report dated Jun. 13, 2022 for copending Chinese App. No. 201980078891.3.
Chinese Office Action dated Jun. 28, 2022 for copending Chinese App. No. 201980078891.3 (w_Eng_transl.).
International Search Report dated Nov. 19, 2019 for copending application PCT/JP2019/037262 (with English translation).
See machine English translation of JP 2014-37790, Feb. 27, 2014.
See machine English translation of JP 2007-117863, May 17, 2007.
See machine English translation of JP 2018-115578, Jul. 26, 2018.
Japanese Office Action dated Feb. 19, 2024 for copending Japanese App. No. 2020-549211 (w_English_translation).

* cited by examiner

[Fig. 1]
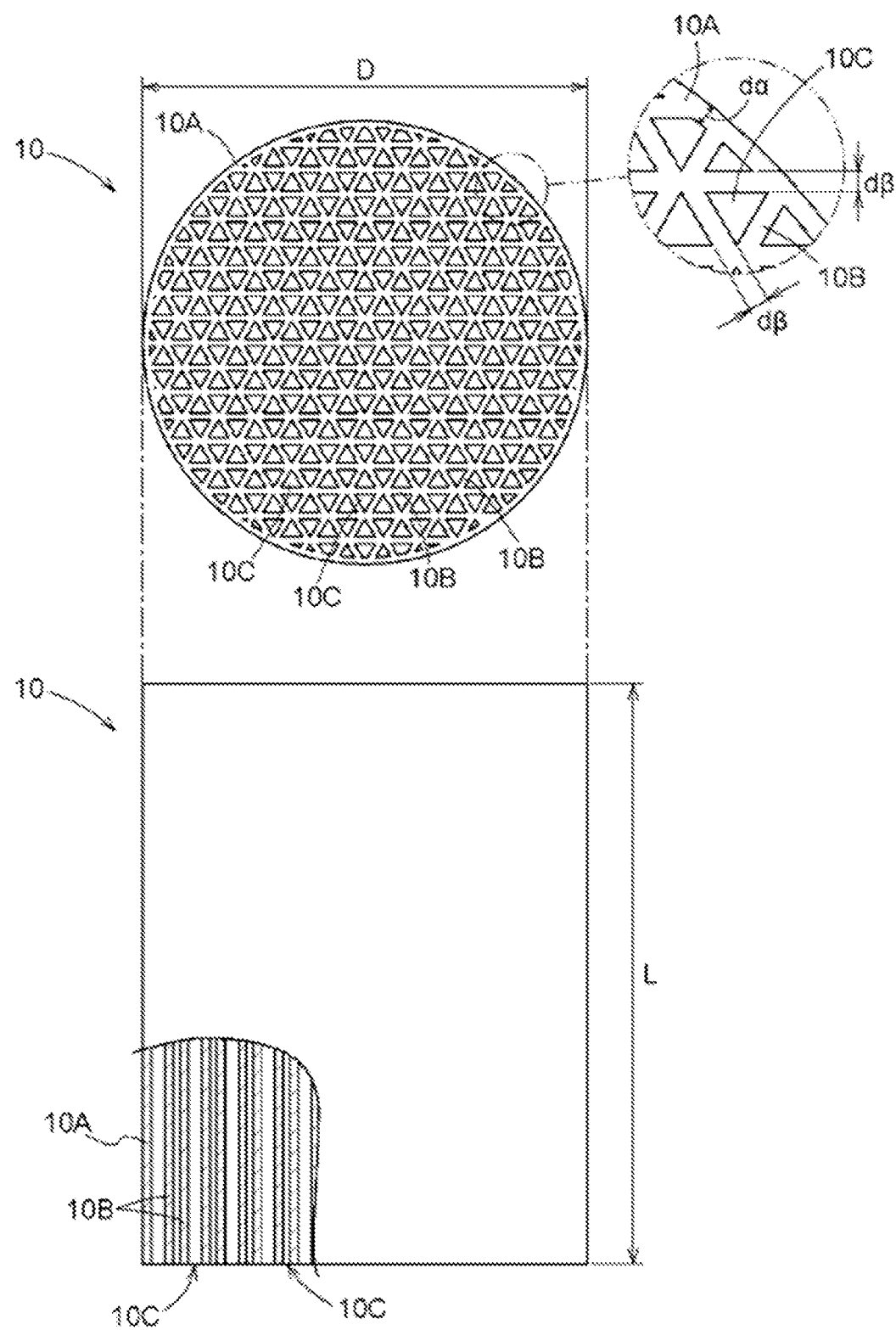

[Fig. 2]
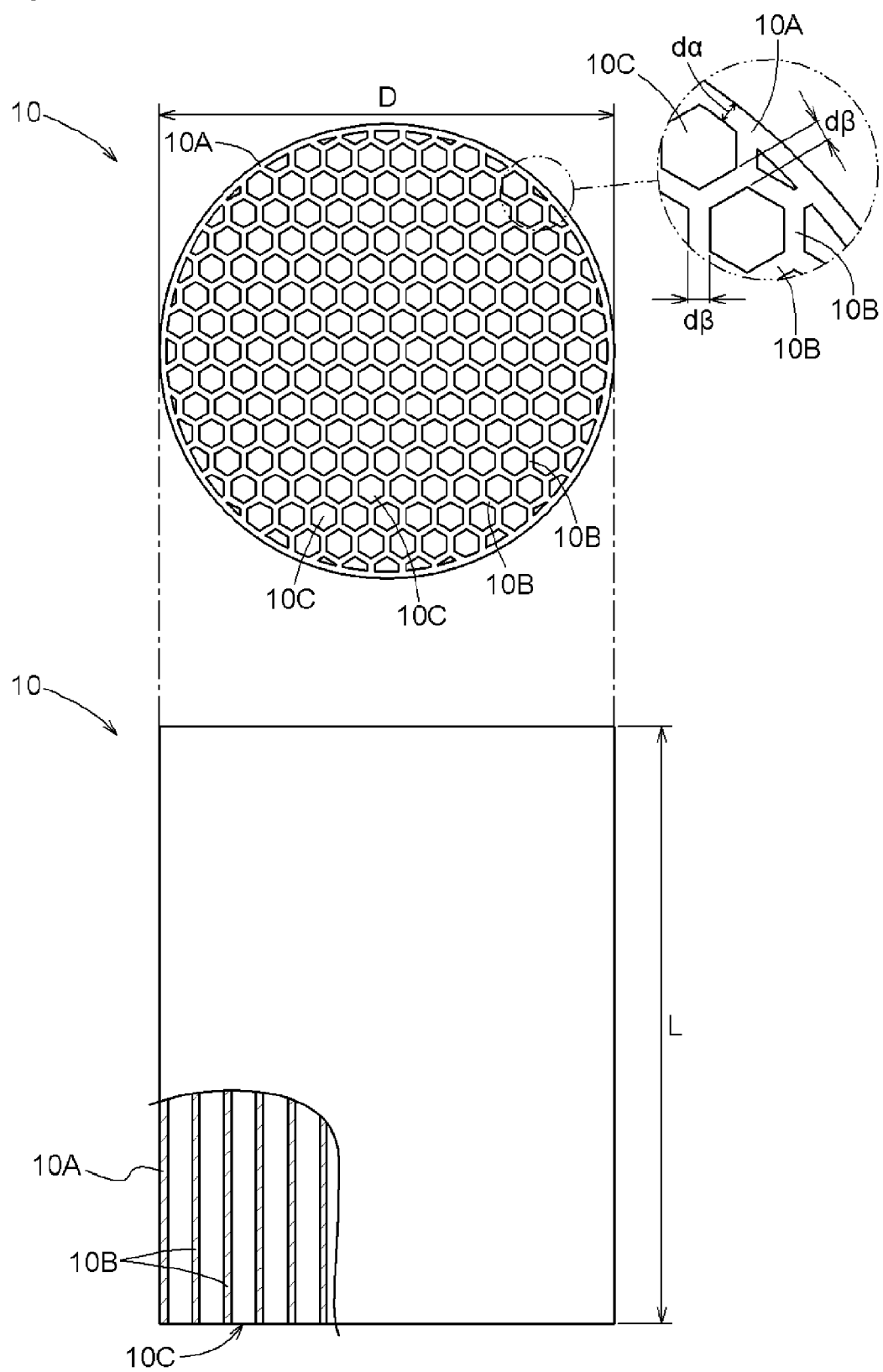

[Fig. 3]
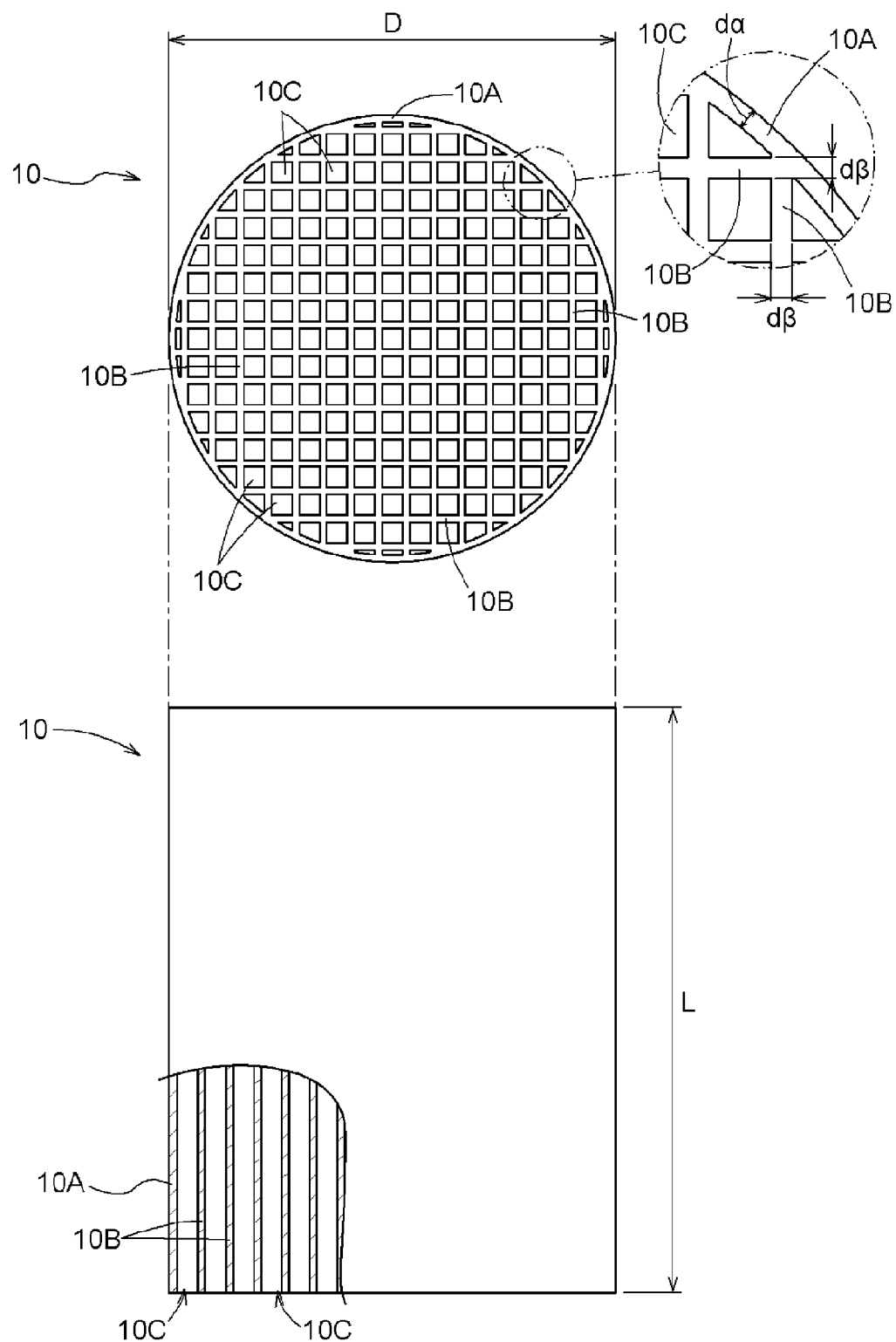

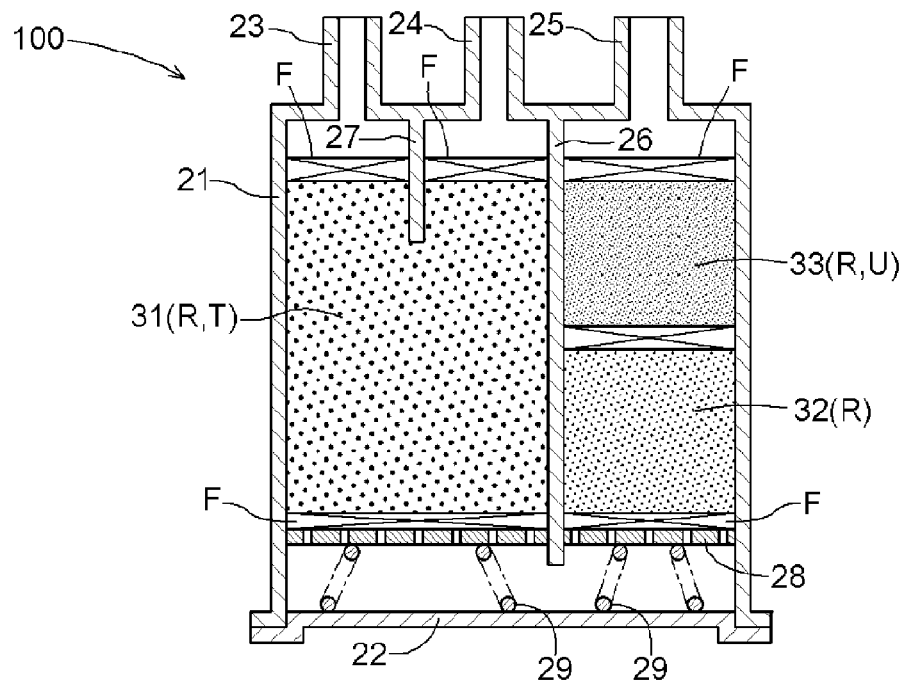
[Fig. 4]
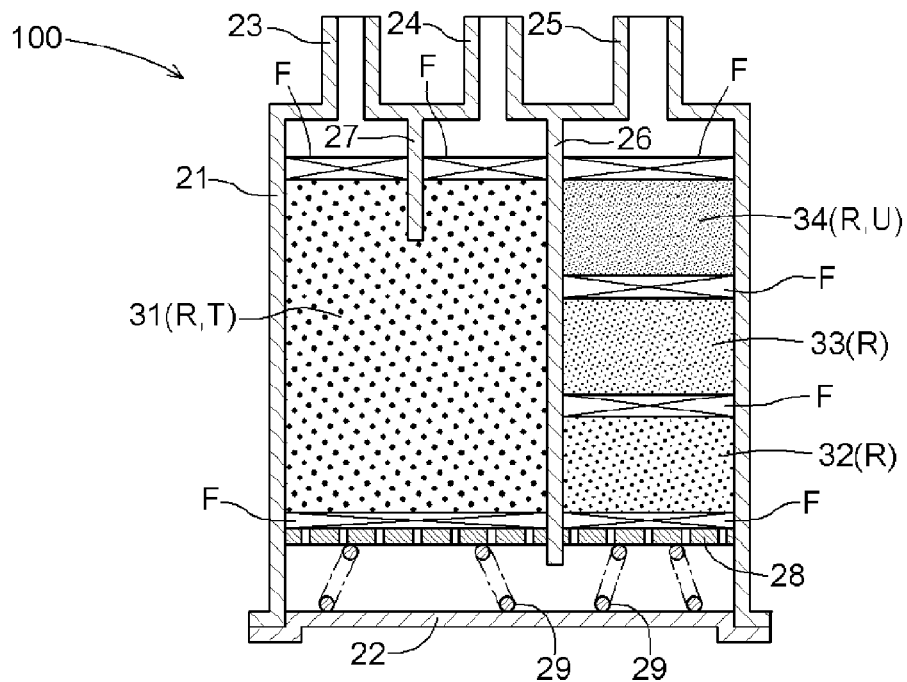
[Fig. 5]

ADSORBENT, CANISTER, AND METHOD FOR PRODUCING ADSORBENT

CROSS-REFERENCE TO RELATED APPLICATIONS

This application claims priority to International Patent Application No. PCT/JP2019/037262, filed on Sep. 24, 2019, and Japanese Patent Application No. JP 2018-185497, filed on Sep. 28, 2018, the contents of both of which are hereby incorporated by reference in their entirety.

TECHNICAL FIELD

The present invention relates to an adsorbent for use in a canister for treating evaporated fuel that prevents emission of evaporated fuel generated from a fuel tank into atmospheric air, a canister, and a method for producing an adsorbent.

BACKGROUND

Conventionally, there have existed canisters for treating evaporated fuel that capture evaporated fuel, generated from volatilization of gasoline fuel stored in a fuel tank while a vehicle is stopped, by adsorption with an adsorbent made of activated carbon or the like to thereby prevent emission of the evaporated fuel into atmospheric air.

Adsorbents such as activated carbon have a property in which the adsorption capacity increases as the temperature becomes lower and the adsorption capacity decreases as the temperature becomes higher. Thus, it is desired that the temperature of the adsorbents be low during adsorption of evaporated fuel and the temperature of the adsorbents be high during purging. Meanwhile, evaporated fuel releases heat corresponding to condensation heat when adsorbed by an adsorbent and draws heat corresponding to evaporation heat when desorbed (purged) from the adsorbent. In other words, adsorption of evaporated fuel to an adsorbent is an exothermic reaction, and desorption from the adsorbent is an endothermic reaction. Then, heat generation/heat absorption due to adsorption/desorption of evaporated fuel acts in the direction opposite to a desired temperature state of the adsorbent, that is, in the direction of impeding the adsorption/desorption performance of the adsorbent. Accordingly, it is desired that temperature change of the adsorbent due to heat generation/heat absorption associated with adsorption/desorption of evaporated fuel be suppressed in order to improve the performance of a canister.

Patent Literature 1 discloses a hollow cylindrical adsorbent having an outer diameter of 4 to 6 mm. This adsorbent is formed by having an outer cylindrical wall and a cross-shaped radial wall extending from the center of the cylindrical wall. Each portion of the cylindrical wall and the radial wall has a thickness of 0.6 to 3 mm. In Patent Literature 2, there is disclosed a hollow cylindrical adsorbent having an outer cylindrical wall having an outer diameter of 4 to 6 mm as in Patent Literature 1 and a cross-shaped radial wall extending from the center of the cylindrical wall. Each portion of this adsorbent has a thickness of 0.6 mm to 1.5 mm. In the Patent Literatures 1 and 2, adsorbents, which are hollow, have a lower pressure drop and better purge performance than those of solid pellets. With respect to the adsorbents of Patent Literatures 1 and 2, in which the thickness of each portion of the cylindrical wall and the radial wall is as thin as 0.6 to 3 mm or 0.6 to 1.5 mm, the cross-shaped radial wall is spanned across the hollow cylindrical inner space to thereby suppress a decrease in the hardness or rigidity of the adsorbent.

DOCUMENT LIST

Patent Literature

Patent Literature 1: Japanese Patent No. 5867800
Patent Literature 2: Japanese Patent No. 6203043

SUMMARY

As described above, with respect to the adsorbents of Patent Literatures 1 and 2, the adsorbents are hollow-cylindrical, and additionally, the inside thereof is partitioned by the radial wall in the shape of a cross to thereby reduce a pressure drop for improvement in the purge performance. However, adsorbents having further improved purge performance are desired.

The present invention has thus been made in view of the above-described problems, and it is an object of the present invention to provide an adsorbent capable of improving purge performance, a canister, and a method for producing an adsorbent.

[Configuration]

A characterizing configuration of an adsorbent according to the present invention lies in an adsorbent to be packed in a canister, comprising:
a cylindrical outer wall, and
a plurality of ribs for partitioning along the axis of the outer wall into a plurality of cells, wherein the thickness of the outer wall and the thickness of the plurality of ribs are less than 0.6 mm, the thickness of at least either of the outer wall and the plurality of ribs exceeds 0.4 mm, wherein the outer diameter of the outer wall is 3.5 mm or more and 40 mm or less, wherein the BWC in a BWC evaluation method in accordance with ASTM D5228 exceeds 3.0 g/dL, and wherein the purge efficiency represented by the following equation in the BWC evaluation method in accordance with ASTM D5228 is 0.86 or more:

$$\text{purge efficiency} = (\text{amount of butane adsorbed} - \text{amount of butane retained})/\text{amount of butane adsorbed} \quad (1).$$

According to the above characterizing configuration, in the adsorbent, the inner space formed by the outer wall is divided by a plurality of ribs into cells, which are a plurality of small spaces extending along the axis of the cylindrical outer wall. Purge air can flow through inside the cells along the axis but easily flows through the outer wall and ribs also in the thickness direction because the thickness of the outer wall and plurality of ribs constituting the adsorbent is as relatively thin as less than 0.6 mm. In other words, the purge air easily flows due to the small spaces formed by the cells, and the purge air easily flows through inside the outer wall and inside the ribs, and thus, the purge performance can be improved. Likewise, evaporated fuel flows through inside the cells along the axis and additionally easily flows through the outer wall and the ribs also in the thickness direction. Thus, it can be also said that butane and the like in the evaporated fuel are captured in the outer wall and ribs on a molecular level to thereby enable the adsorption performance to be improved. In accordance with this, DBL (Diurnal Breathing Loss) performance is also improved.

When the thickness of the outer wall and ribs is 0.6 mm or more, the adsorption performance and purge performance are degraded.

The thickness of the outer wall and plurality of ribs is made thin in order to improve at least either of the adsorption performance and purge performance in this manner. In this case, the inner space formed by the outer wall is divided by the plurality of ribs into a plurality of cells, and thus, the external pressure, internal pressure, and the like to be applied on the adsorbent will be dispersed by the plurality of ribs. Then, the hardness or rigidity of the adsorbent can be relatively enhanced, and thus, breakage and the like of the adsorbent can be suppressed. In addition, since the thickness of at least either of the outer wall and the ribs exceeds 0.4 mm, the thickness is not excessively thin, and the hardness or rigidity of the adsorbent can be maintained. When the thickness of both the outer wall and the ribs is 0.4 mm or less, the rigidity of the adsorbent decreases.

The adsorbent comprising an outer wall and a plurality of ribs according to the above characterizing configuration is configured to have a BWC (Butane Working Capacity) of more than 3.0 g/dL and has a relatively large effective amount of butane to be adsorbed and high adsorption performance. In this case, size and weight reduction of the adsorbent can be achieved. The above adsorbent also has purge efficiency, which is a ratio of the amount of butane desorbed after butane is adsorbed thereon and then desorbed therefrom, of 0.86 or more, and thus, causes the amount of butane remaining in the adsorbent to be reduced to thereby enable the DBL performance to be improved.

When the BWC becomes excessively large, the purge performance and DBL performance are degraded. Thus, it is preferable that the BWC be 13.0 g/dL or less. In order to suppress degradation of the purge performance and DBL performance, the BWC is more preferably 11.0 g/dL or less.

[Configuration]

A further characterizing configuration of the adsorbent according to the present invention lies in that the outer diameter of the outer wall is 3.5 mm or more and 10 mm or less.

According to the above characterizing configuration, in an adsorbent having an outer diameter of the outer wall of 3.5 mm or more and 10 mm or less, the thickness of the outer wall and plurality of ribs is made as relatively thin as less than 0.6 mm. Accordingly, purge air flows through the cells and also easily flows through inside the outer wall and inside the ribs. Thus, also in a small adsorbent having an outer diameter of the outer wall of 3.5 mm or more and 10 mm or less, the purge performance and DBL performance can be improved. Likewise, evaporated fuel flows through the cells and also easily flows through inside the outer wall and inside the ribs, and thus, it can be also said that the adsorption performance can be improved.

[Configuration]

A further characterizing configuration of the adsorbent according to the present invention lies in that the thickness of the outer wall and the thickness of the plurality of ribs is less than 0.45 mm and the outer diameter of the outer wall is more than 10 mm and 40 mm or less.

According to the above characterizing configuration, conforming an adsorbent to have an outer diameter of the outer wall of more than 10 mm and 40 mm or less enables the thickness of the outer wall and the thickness of the plurality of ribs to be made as thin as less than 0.45 mm, in comparison with the case of the outer diameter of the outer wall of 10 mm or less.

Thereby, the purge performance and DBL performance can be improved. When the thickness of the outer wall and the thickness of the plurality of ribs are thin as described above, it can be also said that the adsorption performance can be improved.

When the outer diameter of the adsorbent is made as relatively large as more than 10 mm and 40 mm or less as described above, the inner space to be formed by the outer wall will increases, and cells of 200 cells/inch$^2$ or more, as viewed in the axis direction, can be formed in this inner space. Thus, the number of ribs increases in accordance with the number of cells, the external pressure, internal pressure, and the like to be applied on the adsorbent can be dispersed by the ribs. Thus, the hardness or rigidity of the adsorbent can be maintained even when the thickness of the outer wall and the thickness of the plurality of ribs are set to less than 0.45 mm.

[Configuration]

A characterizing configuration of an adsorbent according to the present invention lies in an adsorbent to be packed in a canister, comprising:

a cylindrical outer wall, and a plurality of ribs for partitioning along the axis of the outer wall into a plurality of cells, wherein the thickness of the outer wall and the thickness of the plurality of ribs are less than 0.6 mm, the outer diameter of the outer wall is 3.5 mm or more and 40 mm or less, a metal oxide of 10% by mass or more and 70% by mass or less is included in the adsorbent with respect to the adsorbent, the BWC in a BWC evaluation method in accordance with ASTM D5228 exceeds 3.0 g/dL, and the purge efficiency represented by the following equation in the BWC evaluation method in accordance with ASTM D5228 is 0.86 or more:

purge efficiency=(amount of butane adsorbed−amount of butane retained)/amount of butane adsorbed    (1).

According to the above characterizing configuration, in the adsorbent, the inner space formed by the outer wall is divided by a plurality of ribs into cells, which are a plurality of small spaces extending along the axis of the cylindrical outer wall. Purge air can flow through inside the cells along the axis but easily flows through the outer wall and ribs also in the thickness direction because the thickness of the outer wall and plurality of ribs constituting the adsorbent is as relatively thin as less than 0.6 mm. In other words, the purge air easily flows due to the small spaces formed by the cells, and the purge air easily flows through inside the outer wall and inside the ribs, and thus, the purge performance can be improved. Likewise, evaporated fuel flows through inside the cells along the axis and additionally easily flows through the outer wall and the ribs also in the thickness direction. Thus, it can be also said that butane and the like in the evaporated fuel are captured in the outer wall and ribs on a molecular level to thereby enable the adsorption performance to be improved. In accordance with this, the DBL (Diurnal Breathing Loss) performance is also improved. When the thickness of the outer wall and ribs is 0.6 mm or more, the adsorption performance and purge performance are degraded.

The thickness of the outer wall and plurality of ribs has been made thin in order to improve at least either of the adsorption performance and purge performance in this manner. In this case, the inner space formed by the outer wall is divided by the plurality of ribs into a plurality of cells, and thus, the external pressure, internal pressure, and the like to be applied on the adsorbent will be dispersed by the plurality of ribs. Then, the hardness or rigidity of the adsorbent can be relatively enhanced, and thus, breakage and the like of the adsorbent can be suppressed. In addition, since the thickness of both the outer wall and the ribs exceeds 0.4 mm, the thickness is not excessively thin, and the rigidity of the adsorbent can be maintained. When the thickness of at least either of the outer wall and the ribs is 0.4 mm or less, the rigidity of the adsorbent decreases.

Additionally, since the metal oxide, as inorganic matter having a relatively high hardness, is included at 10% by mass or more and 70% by mass or less with respect to the adsorbent, the hardness or rigidity of the adsorbent can be further enhanced, in addition to thermal control during adsorption and desorption by a high thermal capacity per volume of the metal oxide.

The adsorbent comprising an outer wall and a plurality of ribs according to the above characterizing configuration is configured to have a BWC (Butane Working Capacity) of more than 3.0 g/dL and has a relatively large effective amount of butane to be adsorbed and high adsorption performance. In this case, size and weight reduction of the adsorbent can be achieved. The above adsorbent also has purge efficiency, which is a ratio of the amount of butane desorbed after butane is adsorbed thereon and then desorbed therefrom, of 0.86 or more, and thus, causes the amount of butane remaining in the adsorbent to be reduced to thereby enable the DBL performance to be improved.

When the BWC becomes excessively large, the purge performance and DBL performance are degraded. Thus, it is preferable that the BWC be 13.0 g/dL or less. In order to suppress degradation of the purge performance and DBL performance, the BWC is more preferably 11.0 g/dL or less.

[Configuration]

A further characterizing configuration of the adsorbent according to the present invention lies in that each shape of the plurality of cells is at least either of a triangular shape and a hexagonal shape, as viewed in the axis direction.

According to the above characterizing configuration, when each cell is at least either of triangular-shaped and hexagonal-shaped, the ribs are located corresponding to each of sides forming a triangular shape and a hexagonal shape. Thus, in the inner space formed by the outer wall, at least some of the ribs are disposed radially with respect to the center of the inner space. Thereby, the external pressure, internal pressure, and the like to be applied on the adsorbent are substantially uniformly dispersed over the entire adsorbent to thereby enable the hardness or rigidity of the adsorbent to be enhanced.

[Configuration]

A further characterizing configuration of the adsorbent according to the present invention lies in that, in the adsorbent, the difference of the amount of equilibrium adsorption of n-butane concentrations between n-butane concentrations of 5 vol % and 50 vol % exceeds 35 g/L.

According to the above characterizing configuration, due to the large effective amount to be adsorbed of molecules such as butane and the like in the evaporated fuel, it is possible to improve the adsorption performance of the adsorbent. Thereby, size and weight reduction of the adsorbent can be achieved.

[Configuration]

A further characterizing configuration of the adsorbent according to the present invention lies in that the adsorbent is configured to include at least activated carbon and a temperature control material in which at least one of the volume specific heat and the thermal conductivity is higher than those of the activated carbon.

According to the above characterizing configuration, as one aspect, a temperature control material having a higher volume specific heat, that is, a higher thermal capacity, than that of the activated carbon is included in the adsorbent. As one aspect, a temperature control material having a higher thermal conductivity than that of the activated carbon is included in the adsorbent.

The heat generation of the activated carbon during adsorption of evaporated fuel is thus transferred to the temperature control material. Then, the temperature rise of the activated carbon is suppressed, and the adsorption performance of the above adsorbent is improved. In contrast, the activated carbon draws the potential heat of the temperature control material during purging of the fuel adsorbed. Then, a temperature drop of the activated carbon is suppressed, and the purge performance of the above adsorbent is improved.

[Configuration]

A further characterizing configuration of the adsorbent according to the present invention lies in that the temperature control material is at least any material of a metal oxide, a phase change material having a phase change temperature of 36° C. or less, and a phase transition material having a phase transition temperature of 36° C. or less.

Metal oxides generally have a larger volume specific heat and a larger thermal conductivity and have a higher thermal capacity, in comparison with activated carbon. In the above characterizing configuration, when the temperature control material is a metal oxide, a temperature rise and a temperature drop of the adsorbent are suppressed, and the adsorption performance and purge performance can be improved.

The temperature control material, which is at least either of a phase change material having a phase change temperature of 36° C. or less and a phase transition material having a phase transition temperature of 36° C. or less, has a thermal capacity higher than that of activated carbon. In the above characterizing configuration, when the temperature control material is at least either one of the phase change material and the phase transition material, the heat generation of the activated carbon during adsorption of evaporated fuel is thus transferred to the temperature control material. Then, the temperature rise of the activated carbon is suppressed, and the adsorption performance of the above adsorbent is improved. In contrast, during purging of the fuel adsorbed, the temperature drop rate of the activated carbon is suppressed by the action of the metal oxide having a high thermal capacity and the materials having a phase change function and a phase transition function, and the purge performance of the above adsorbent is improved.

[Configuration]

A further characterizing configuration of the adsorbent according to the present invention lies in that the adsorbent is configured to include at least activated carbon, first pores of less than 100 nm derived from the activated carbon and second pores of 100 nm or more derived from meltable cores are formed in the adsorbent, and the volume of the second pores is more than 0.05 mL/g and 0.35 mL/g or less with respect to the mass of the adsorbent.

According to the above characterizing configuration, the pore volume of the second pores having a pore diameter 100 nm or more is more than 0.05 mL/g and 0.35 mL/g or less with respect to the mass of the adsorbent. Thus, paths through which the evaporated fuel and purge air flow are moderately formed inside the adsorbent, and flowing of the evaporated fuel and purge air becomes better via the second pores, and the adsorption performance and purge performance are improved.

When the pore volume of the second pores is 0.05 mL/g or less with respect to the mass of the adsorbent, the proportion of the paths inside the adsorbent is small, the desorption/adsorption rate becomes slower, and the adsorption performance and purge performance are degraded. When the pore volume of the second pores exceeds 0.35 mL/g with respect to the mass of the adsorbent, paths through which the evaporated fuel and purge air flow are excessively formed inside the adsorbent, and the strength decreases. Additionally, the content of the activated carbon is lowered, and thus the BWC value decreases.

[Configuration]

A further characterizing configuration of the adsorbent according to the present invention lies in that the number of cells of the plurality of cells is 200 cells/inch$^2$ or more and the number of ribs of the plurality of ribs is 4 or more.

According to the above characterizing configuration, the number of cells is 200 cells/inch$^2$ or more, the number of ribs is as large as 4 or more. Thus, the external pressure, internal pressure, and the like to be applied on the adsorbent are dispersed by the many ribs, and the hardness or rigidity of the adsorbent is enhanced.

[Configuration]

A characterizing configuration of a canister according to the present invention lies in a canister for treating evaporated fuel, the canister having a tank port in communication with an upper air chamber of a fuel tank of an internal combustion engine, a purge port in communication with an intake path of the internal combustion engine, an atmospheric air port to be opened to atmospheric air, and an adsorbent chamber in which the evaporated fuel flows from the tank port to the atmospheric air port, wherein the above adsorbent is provided in an atmospheric air-side adjacent region adjacent to the atmospheric air port in the adsorbent chamber.

Desorption (purge) of the evaporated fuel from the activated carbon included in the adsorbent is conducted by inflow of atmospheric air from the atmospheric air port by intake from the purge port. Heat is drawn when the evaporated fuel is desorbed from the activated carbon, and thus, the temperature of the activated carbon decreases, and the purge performance of the activated carbon is degraded. For example, the temperature of the activated carbon falls below 10° C., the purge performance is markedly degraded. According to the above characterizing configuration, the above-described adsorbent is provided in an atmospheric air-side adjacent region adjacent to the atmospheric air port in the adsorbent chamber. In the above-described adsorbent, making the thickness of the outer wall and plurality of ribs as relatively thin as less than 0.6 mm allows purge air to flow through the cells and also to flow through inside the outer wall and inside the ribs. For this reason, the purge performance and DBL performance are excellent. Accordingly, since the above-described adsorbent is provided in the atmospheric air-side adjacent region, purge processing is appropriately conducted.

[Configuration]

A further characterizing configuration of the canister according to the present invention lies in that an adsorbent as described above is provided in an atmospheric air-side separate region more separate from the atmospheric air port than the atmospheric air-side adjacent region and adjacent to the atmospheric air-side adjacent region, the adsorbent provided in the atmospheric air-side adjacent region is a honeycomb adsorbent having an outer diameter of the outer wall of more than 10 mm and 40 mm or less, and the adsorbent provided in the atmospheric air-side separate region is honeycomb pellets having an outer diameter of the outer wall of 3.5 mm or more and 10 mm or less.

According to the above characterizing configuration, even if the activated carbon provided in a region more separate with respect to the atmospheric air port than the atmospheric air-side separate region has a higher BWC and a higher butane adsorption performance, the honeycomb pellets and honeycomb adsorbent provided respectively in the atmospheric air-side separate region and atmospheric air-side adjacent region enables the DBL performance of the canister to be improved. In other words, even when the amount of butane adsorbed has increased by the activated carbon provided in the region more separate with respect to the atmospheric air port than the atmospheric air-side separate region, the relatively small honeycomb pellets are provided in the atmospheric air-side separate region, and thus, the purge performance in the atmospheric air-side separate region can be improved and the DBL performance of the canister can be improved due to the large outer surface area of the honeycomb pellets and the like. Since the relatively large honeycomb adsorbent is further provided in the atmospheric air-side adjacent region adjacent to the atmospheric air-side separate region, the BWC of the adsorbent (honeycomb adsorbent) in the atmospheric air-side adjacent region is low, the amount of butane remaining after purge is small, and thus the performance of the DBL is improved.

[Configuration]

A further characterizing configuration of the canister according to the present invention lies in that a relationship: BWC of the honeycomb pellets>BWC of the honeycomb adsorbent is satisfied.

According to the above characterizing configuration, the honeycomb pellets and the honeycomb adsorbent are provided respectively in the atmospheric air-side separate region and the atmospheric air-side adjacent region in sequence toward the atmospheric air port. Then, the relationship: BWC of the honeycomb pellets>BWC of the honeycomb adsorbent is satisfied, and the BWC becomes smaller as heading toward the atmospheric air port. For this reason, the amount of butane remaining after purge can be smaller as heading toward the atmospheric air port. Thus, the purge performance of the canister can be improved, and the DBL performance can be improved.

[Configuration]

A further characterizing configuration of the canister according to the present invention lies in that an adsorbent including activated carbon having a BWC of 15.0 g/dL or more in a BWC evaluation method in accordance with ASTM D5228 and a temperature control material, which is at least either of a phase change material having a phase change temperature of 36° C. or more and a phase transition material having a phase transition temperature of 36° C. or more, is provided in a tank-side adjacent region adjacent to the tank port in the adsorbent chamber.

According to the above characterizing configuration, an adsorbent including a temperature control material such as a phase change material that absorbs and releases latent heat according to changes in temperature is provided in the tank-side adjacent region in the adsorbent chamber. Accordingly, temperature changes of the activated carbon can be suppressed and degradation in the performance of the activated carbon can be prevented by the adsorbent.

When refueling to the fuel tank is conducted, a large amount of evaporated fuel may flow at a time into the canister. The evaporated fuel flowing from the tank port forms an adsorption zone from the vicinity of the tank port toward the atmospheric air port, and the temperature of the activated carbon in the adsorption zone increases due to adsorption heat. The adsorption performance of the activated carbon markedly decreases when the temperature of the activated carbon exceeds 35° C. (about 35° C.). According to the above characterizing configuration, the tank-side adjacent region is a region where the temperature of the activated carbon increases to 35° C. or more due to heat generated by adsorption of evaporated fuel to the activated carbon during refueling to the fuel tank, and an adsorbent including a temperature control material, which is at least either of a phase change material having a phase change temperature of 36° C. or more and a phase transition material having a phase transition temperature of 36° C. or more, is provided in the tank-side adjacent region. Thus, this is preferable because a situation in which the temperature of the activated carbon exceeds 35° C. be suppressed.

Further, since the adsorbent of the activated carbon is to be provided in the tank-side adjacent region, a reduction in the amount of the activated carbon to be accommodated in the adsorbent chamber is suppressed, and degradation in the adsorption performance can be suppressed.

[Configuration]

A characterizing configuration of a method for producing an adsorbent according to the present invention lies in a method for producing the above adsorbent, wherein at least activated carbon, an organic binder, a crosslinking agent, and an inorganic material are mixed and then kneaded, the kneaded material kneaded is molded into a molded body, and the molded body is subjected to a drying treatment at 100° C. or more and 200° C. or less.

According to the above characterizing configuration, an adsorbent having improved purge performance and DBL performance can be produced, and likewise, it also can be said that an adsorbent having improved adsorption performance can be produced. Since activated carbon is included in the adsorbent, butane and the like in the evaporated fuel are captured at a molecular level, and the adsorption performance can be improved. Further, subjecting a molded body including an organic binder and a crosslinking agent added to a drying treatment causes the organic binder to be crosslinked, and the resistance to evaporated fuel can be improved. Additionally, since the inorganic material is included, the BWC is enhanced, and breakage of the molded body in the drying treatment is suppressed.

[Configuration]

A characterizing configuration of a method for producing an adsorbent according to the present invention lies in a method for producing the above adsorbent, wherein at least activated carbon, an organic binder, and an inorganic material are mixed and then kneaded, the kneaded material kneaded is molded into a molded body, and the molded body is subjected to a firing treatment at 700° C. or more and 900° C. or less.

According to the above characterizing configuration, an adsorbent having improved purge performance and DBL performance can be produced, and likewise, it also can be said that an adsorbent having improved adsorption performance can be produced. Since activated carbon is included in the adsorbent, butane and the like in the evaporated fuel are captured at a molecular level, and the adsorption performance can be improved. Further, the evaporated fuel and purge air flow through the pores after the organic binder disappeared by a firing treatment to thereby enable the adsorption performance and purge performance to be improved. Additionally, since the inorganic material is included, the BWC is enhanced, and breakage of the molded body in the firing treatment is suppressed.

[Configuration]

A further characterizing configuration of the method for producing an adsorbent according to the present invention lies in that further, as the temperature control material in which at least one of the volume specific heat and the thermal conductivity is higher than those of the activated carbon, at least any material of a metal oxide, a phase change material having a phase change temperature of 36° C. or less, and a phase transition material having a phase transition temperature of 36° C. or less is mixed and then kneaded.

According to the above characterizing configuration, addition of at least any of a metal oxide, a phase change material, and a phase transition material that generally have a larger volume specific heat and have a higher thermal conductivity than those of activated carbon as the temperature control material to the adsorbent can suppress a temperature rise and a temperature drop of the adsorbent, and the adsorption performance and purge performance can be improved.

[Configuration]

A further characterizing configuration of the method for producing an adsorbent according to the present invention lies in that, further, meltable cores are mixed and then kneaded.

According to the above characterizing configuration, molding the kneaded material including meltable cores and subjecting the molded material to a drying treatment or firing treatment causes the meltable cores to be sublimated or decomposed to thereby form pores. These pores, which serve as paths through which the evaporated fuel and purge air flow, can improve the adsorption performance and purge performance

[Configuration]

A further characterizing configuration of the method for producing an adsorbent according to the present invention lies in that, further, a metal oxide at 10% by mass or more and 70% by mass or less with respect to the adsorbent is mixed and then kneaded.

Since the metal oxide, which is inorganic matter having a relatively high hardness, is included at 10% by mass or more and 70% by mass or less with respect to the adsorbent, the hardness or rigidity of the adsorbent can be further enhanced, in addition to thermal control during adsorption and desorption by a high thermal capacity per volume of the metal oxide.

BRIEF DESCRIPTION OF THE DRAWINGS

FIG. 1 is a plan view and a side view illustrating the shape of an adsorbent having triangular-shaped cells.

FIG. 2 is a plan view and a side view illustrating the shape of an adsorbent having hexagonal-shaped cells.

FIG. 3 is a plan view and a side view illustrating the shape of an adsorbent having rectangular-shaped cells.

FIG. 4 is a schematic cross-sectional view illustrating the structure of a canister.

FIG. 5 is a schematic cross-sectional view illustrating the structure of a canister.

DETAILED DESCRIPTION

First Embodiment

Hereinafter, a canister and an adsorbent for use in the canister according to a first embodiment will be described. In the present embodiment, the canister is used to treat evaporated fuel generated from a fuel tank of an automobile. The adsorbent is packed in this canister.

The evaporated fuel generated by an increase in the temperature of the fuel tank while the engine is running, while the vehicle is stopped, or the like is adsorbed by the adsorbent packed in the canister and is thereby prevented from being released into atmospheric air. The evaporated fuel adsorbed by the adsorbent is desorbed (purged) by a vacuum pump that is driven and controlled independently of the negative pressure in the air intake pipe while the engine is running and the running of the engine, and the adsorbent is regenerated.

(1) External Configuration of Adsorbent

The external configuration of the adsorbent will be first described hereinafter with reference to FIG. 1.

As shown in FIG. 1, an adsorbent 10 of the present embodiment has a cylindrical outer wall 10A and a plurality of ribs 10B that partitions the inside of the outer wall 10A along the axis of the outer wall 10A into a plurality of cells 10C. In other words, the adsorbent 10 is configured as a hollow-shaped molded body and formed by the cylindrical outer wall 10A and the ribs 10B constituting a wall that partitions the inner space inside the cylindrical outer wall 10A. Then, the ribs 10B partition the inner space formed by the outer wall 10A into a honeycomb shape as viewed in the axis direction to thereby form a plurality of cells 10C. Here, in the honeycomb shape, not only a case where the cells 10C are hexagonal-shaped as viewed in the axis direction, but also various shapes such as a triangular shape, a rectangular shape, and pentagonal shape are included. In FIG. 1, each of the cells 10C has a triangular shape as viewed in the axis direction.

Particularly, a case where the cells 10C are regular triangular-shaped as viewed in the axis direction is preferable because six of the cells 10C are combined to form a regular hexagonal shape and thus the number of cells can be maintained by efficiently forming a plurality of cells 10C in the inner space.

The outer wall 10A and ribs 10B extend in the longitudinal direction (in the height direction as viewed from a side). Thereby, the plurality of cells 10C partitioned into a honeycomb shape are formed extending in the longitudinal direction. When the adsorbent 10 has such a honeycomb shape, purge air easily flows through in the hollow region of the cells 10C, and the contact time, contact area, and the like between the activated carbon and the purge air are extended to thereby enable the purge performance to be improved. Likewise, the evaporated fuel in the cells 10C smoothly flows through, and the contact time, contact area, and the like between the activated carbon constituting the adsorbent 10 and the evaporated fuel are extended to thereby also enable the adsorption performance to be improved. In other words, according to the adsorbent 10 of the present embodiment, the purge performance can be improved. It also can be said that both the purge performance and the adsorption performance can be improved.

The outer diameter (diameter) D of the adsorbent 10 is, for example, 3.5 mm or more and 40 mm or less, and the length in the longitudinal direction L thereof is, for example, 200 mm or less. In the present embodiment, the thickness dα of the outer wall 10A and the thickness dβ of the ribs 10B are formed as thin as less than 0.6 mm. Further, at least either thickness of the thickness dα of the outer wall 10A and the thickness dβ of the ribs 10B exceeds 0.4 mm. An adsorbent 10 having a relatively large outer diameter D and length L may be simply referred to as a honeycomb adsorbent, and an adsorbent 10 having a relatively small outer diameter D and length L may be referred to as a honeycomb pellet. For example, an adsorbent 10 having an outer diameter D of 3.5 mm or more and 10 mm or less may be referred to as a honeycomb pellet, and an adsorbent 10 having an outer diameter of more than 10 mm and 40 mm or less may be referred to as a honeycomb adsorbent.

In the adsorbent 10 having the above outer diameter D, when the thickness dα of the outer wall 10A and the thickness dβ of the ribs 10B are made thin as described above, for example, cells 10C of 200 cells/inch$^2$ or more can be formed, as viewed in the axis direction, in an inner space to be surrounded by the outer wall 10A. Thus, the number of ribs increases in accordance with the number of the cells, the external pressure, internal pressure, and the like to be applied on the adsorbent 10 can be dispersed by the ribs 10B, and the hardness or rigidity of the adsorbent 10 can be maintained.

This adsorbent 10 further has a BWC (Butane Working Capacity) more than 3.0 g/dL. The BWC is an evaluation value of the butane adsorption performance to be measured by a BWC evaluation method in accordance with ASTM D5228. The adsorbent 10 has purge efficiency of 0.86 or more, represented by the following equation in a BWC evaluation method in accordance with ASTM D5228.

$$\text{Purge efficiency} = (\text{amount of butane adsorbed} - \text{amount of butane retained})/\text{amount of butane adsorbed} \quad (1)$$

According to the above adsorbent 10, the inner space formed by the outer wall 10A in the adsorbent 10 is divided by the plurality of ribs 10B into cells 10C, which are a plurality of small spaces. Purge air can flow through inside the cells 10C along the direction in which the cells 10C extend, and easily flows through the outer wall 10A and ribs 10B also in the thickness direction because the thickness of the outer wall 10A and the plurality of ribs 10B constituting the adsorbent 10 is as relatively thin as less than 0.6 mm. In other words, purge air flows through along the direction in which the cells 10C extend as well as easily flows through the outer wall 10A and ribs 10B in the thickness direction, and thus, the purge performance can be improved. In accordance with this, the DBL (Diurnal Breathing Loss) performance is also improved. Likewise, the evaporated fuel also easily flows through due to the small spaces formed by the cells 10C, and the evaporated fuel easily flows through in the outer wall 10A and ribs 10B. Thus, butane and the like in the evaporated fuel are captured in the outer wall 10A and ribs 10B on a molecular level, and the adsorption performance can be also improved. In other words, according to the adsorbent 10 having a relatively small thickness of the outer wall 10A and ribs 10B as in the present embodiment, the purge performance can be improved, and both the purge performance and the adsorption performance cam be also improved. When the thickness dα of the outer wall 10A and the thickness dβ of the ribs 10B are 0.6 mm or more, the adsorption performance and purge performance are degraded.

The thickness dα of the outer wall 10A and the thickness dβ of the plurality of ribs 10B are made thin in order to improve at least either of the purge performance and the adsorption performance as described above. Since the inner space to be formed by the outer wall 10A is divided by the plurality of ribs 10B into the plurality of cells 10C, the external pressure, internal pressure, and the like to be applied on the adsorbent 10 are dispersed by the plurality of ribs 10B. Then, the rigidity of the adsorbent 10 can be relatively enhanced, and thus, breakage or the like of the adsorbent 10 can be suppressed. In addition, since at least either thickness of the thickness dα of the outer wall 10A and the thickness dβ of the ribs 10B exceeds 0.4 mm, the thickness is not excessively thin, and the rigidity of the adsorbent 10 can be maintained. When both the thickness dα of the outer wall 10A and the thickness dβ of the ribs 10B are 0.4 mm or less, the ridigity of the adsorbent 10 decreases.

As shown in FIG. 1 above, in the adsorbent 10, the cells 10C are each formed in a triangular shape. Thus, since at least some of the plurality of ribs 10B extend radially with respect to the center of the inner space formed by the outer wall 10A, the external pressure, internal pressure, and the like to be applied to each of the cells 10C are dispersed by these radial ribs 10B over the entire adsorbent 10. Accordingly, while the thickness dα of the outer wall 10A and the thickness dβ of the plurality of ribs 10B are made thin, the rigidity of the adsorbent 10 can be maintained. Particularly, a case where the cells 10C are regular triangular-shaped is preferable because six cells 10C can be combined to form a regular hexagonal shape and the external pressure, internal pressure, and the like to be applied on each of the cells 10C can be dispersed more uniformly to thereby enable the rigidity of the adsorbent 10 to be maintained better.

The above adsorbent 10 is configured to have a BWC of more than 3.0 g/dL, has a relatively large effective amount of butane to be adsorbed, and has high adsorption performance. In this case, size and weight reduction of the adsorbent 10 can be achieved. The above adsorbent 10 also has purge efficiency, which is the ratio of the amount of butane desorbed after butane is adsorbed thereon and then is desorbed therefrom, of 0.86 or more. Thus, the amount of butane remaining in the adsorbent is reduced, and the DBL performance can be improved.

In the adsorbent 10 shown in FIG. 1 above, the cells 10C are each triangular-shaped, but the shape of the cells 10C is not limited thereto. For example, as shown in the adsorbent 10 of FIG. 2, the cells 10C each may be hexagonal-shaped. Further, for example, as shown in the adsorbent 10 of FIG. 3, the cells 10C each may be rectangular-shaped.

In the adsorbent 10 of FIG. 2 and FIG. 3, the reference numerals same as in FIG. 1 represent the same constituent elements. In the adsorbent 10 of FIG. 2, as viewed in the axis direction, the inner space of the outer wall 10A are divided into a plurality of hexagonal-shaped cells 10C, and the ribs 10B constitute the hexagonal contour of the cells 10C. Thus, since at least some of the plurality of ribs 10B extend radially with respect to the center of the inner space formed by the outer wall 10A, the external pressure, internal pressure, and the like to be applied to each of the cells 10C are dispersed by these radial ribs 10B over the entire adsorbent 10. Thereby, while the thickness dα of the outer wall 10A and the thickness dβ of the plurality of ribs 10B are made thin, the rigidity of the adsorbent 10 can be maintained. When the plurality of hexagonal-shaped cells 10C is formed in the inner space of the outer wall 10A, the rigidity of the adsorbent 10 can be maintained even with a smaller number of cells than in a case where triangular-shaped cells 10C are formed.

In the adsorbent 10 of FIG. 3, as viewed in the axis direction, the inner space of the outer wall 10A are divided into a plurality of rectangular-shaped cells 10C, and the ribs 10B constitute the rectangular contour of the cells 10C. Since the plurality of ribs 10B extend in a matrix manner, the external pressure, internal pressure, and the like to be applied on each of the cells 10C are dispersed, and the thickness dα of the outer wall 10A and the thickness dβ of the plurality of ribs 10B can be made thin while the rigidity of the adsorbent 10 is maintained.

As described above, the thickness of the outer wall 10A and the plurality of ribs 10B of the adsorbent 10 is as relatively thin as less than 0.6 mm. Thus, purge air flows through inside the cells 10C as well as flows through the outer wall 10A and ribs 10B also in the thickness direction, and thus the purge performance of butane and the like adsorbed in first pores described below is high, the first pores having been formed in the outer wall 10A and ribs 10B. Likewise, the evaporated fuel not only flows through inside the cells 10C but also easily flows through the outer wall 10A and ribs 10B also in the thickness direction, butane and the like in the evaporated fuel are easily captured in the first pores in the activated carbon, and the adsorption performance of the adsorbent 10 can be improved.

(2) Constituent Materials and Method for Producing Adsorbent

The adsorbent 10 is to be formed of raw materials including at least activated carbon having pores (first pores described below), an organic binder, a crosslinking agent, and an inorganic material.

The method for producing the adsorbent 10 is as follows. The raw materials including the activated carbon, organic binder, crosslinking agent, and inorganic material described above are mixed with water and kneaded using a mixer such as a ribbon mixer. Then, the kneaded material kneaded is molded by extrusion, mold molding, or the like into a honeycomb shape as shown in FIG. 1 to FIG. 3. Thereafter, the molded material is dried using infrared, hot air, steam, microwaves, or the like at about 200° C. or less, for example, about 120° C. for about three hours to produce the adsorbent 10. The drying at a relatively low temperature of about 200° C. or less, for example, about 120° C. may be, for example, a step of extracting water from the molded body during molding, a step of crosslinking the organic binder with the crosslinking agent, a step of solidifying the inorganic material, and the like.

As the activated carbon, commercially available activated carbons obtained from various raw materials such as coal-based, palm shell-based, ligneous, and lignin-based raw materials can be used. Further, activated products of activated carbons are also can be used, such as water vapor-activated products, carbon dioxide-activated products, and chemical-activated products provided by phosphoric acid, zinc chloride, an alkali metal or the like. The activated carbon is formed porous and has first pores having a pore diameter of less than 100 nm. The first pore is preferably 50 nm or less and more preferably 40 nm or less. Further the first pore diameter is preferably, for example, 1 to 10 nm and more preferably 2 to 5 nm.

Then, the activated carbon is preferably in the form of particles or powder in order to improve the adsorption performance for evaporated fuel. The average particle size of the activated carbon is preferably, for example, of the order of 1 μm to 10 mm. For example, a powdered activated carbon having a particle size of 350 μm or less (42 mesh pass) obtained by pulverizing a activated carbon can be used. The specific surface area is usually 500 to 2,500 m²/g and preferably 800 to 2,300 m²/g. The specific surface area of activated carbon to be selected can be appropriately selected in accordance with the BWC value of the adsorbent and the amount of the activated carbon blended.

Here, the pore diameter means the average pore diameter and is measured using, for example, measurement of an adsorption/desorption isotherm by a nitrogen adsorption/desorption method, mercury porosimetry, or the like. In the present embodiment, the pore diameter is measured using mercury porosimetry. Alternatively, the pore diameter can be determined by particle size analysis via a SEM.

As the organic binder, in the present embodiment, in which a drying process is performed in the production of the adsorbent 10, for example, organic binders including cellulose such as carboxymethyl cellulose (CMC), methyl cellulose, hydroxypropyl methyl cellulose, and hydroxyethyl methyl cellulose, and emulsion binders such as EVA (ethylene vinyl acetate), epoxy, latex, styrene, and butadiene can be used. The amount of such an organic binder added is of the order of 3 to 15% by mass based on the total mass of the raw materials for use in production of the adsorbent 10.

As the crosslinking agent, ones that crosslink the organic binder and improve the gasoline resistance, water resistance, and the like are preferable. As the crosslinking agent, for example, polyvalent metal ions, urea, polyamines, methylol melamine, polyamides, epoxy, isocyanates, oxazoline group-containing polymers, and the like, which are usual crosslinking agents, can be used.

Instead of addition of a crosslinking agent, a self-crosslinkable binder may be employed as the organic binder.

As the inorganic material, a powder or sol solid is used, such as powdered bentonite, Kibushi clay, silica sol, alumina sol, and white clay. Addition of the inorganic material can achieve improvement in the BWC and enhancement in the hardness or rigidity of the adsorbent 10. Addition of the inorganic material also can suppress breakage in drying the molded body and the like. The amount of such an inorganic material added is of the order of 10 to 50% by mass based on the total mass of the raw materials including the activated carbon, organic binder, crosslinking agent, and inorganic material for use in production of the adsorbent 10.

(3) Additive Materials to Adsorbent

The above adsorbent 10 is formed of raw materials including at least activated carbon, an organic binder, a crosslinking agent, and an inorganic material, but the following additive materials can be further added.

Carbonized Product

A carbonized product obtained by steaming and baking a raw material such as palm shells and wood flour can be added as an additive material to the raw materials of the adsorbent 10. Addition of the carbonized product can adjust the BWC and also can enhance the hardness or rigidity of the adsorbent 10. The carbonized product is added at a proportion of, for example, 5% by mass or more and 30% by mass or less with respect to the raw materials.

(b) Metal Oxide

A metal oxide can be added as an additive material to the raw materials of the adsorbent 10. The metal oxide is an oxide of, for example, aluminum, iron, or the like. Addition of the metal oxide can enhance the hardness or rigidity of the adsorbent 10, in addition to thermal control during adsorption and desorption by a high thermal capacity per volume of the metal oxide. The metal oxide is added at a proportion of, for example, 10% by mass or more and 70% by mass or less with respect to the raw materials.

(c) Temperature Control Material

A temperature control material that controls the temperature of the adsorbent 10 can be added as an additive material to the raw materials of the adsorbent 10.

It is preferable that, as the temperature control material, a material having a higher thermal capacity than that of the activated carbon be used. For example, as the temperature control material, it is preferable to use a material having a higher volume specific heat than that of the activated carbon. Further, as the temperature control material, it is preferable to use a material having a higher thermal conductivity than that of the activated carbon.

For example, a metal oxide generally having a higher volume specific heat and thermal conductivity than those of the activated carbon can be used. The metal oxide is an oxide of, for example, aluminum, iron, or the like. It is preferable that the metal oxide have a volume specific heat of 0.4 kcal/L·° C. or more and a thermal conductivity of 0.5 kcal/m·h·° C. or more. It is preferable that the metal oxide have a specific heat of 0.25 to 0.4 kcal/kg·° C. or more. For example, the activated carbon has a volume specific heat of 0.05 to 0.12 kcal/L·° C. and a thermal conductivity of 0.064 kcal/m·h·° C.

The adsorbent 10, which includes, in addition to such activated carbon, a metal oxide having a higher thermal capacity and thermal conductivity per volume than those of the activated carbon, would be preferable if having a volume specific heat of 0.08 kcal/L·° C. or more. Further, the adsorbent 10 including the above metal oxide would be preferable if having a thermal conductivity of 0.1 kcal/m·h·° C. or more. The volume specific heat of the adsorbent 10 is more preferably 0.12 kcal/L·° C. or more and further more preferably more than 0.12 kcal/L·° C. It is preferable that the specific heat of the adsorbent 10 be 0.2 kcal/kg·° C. or more.

Adding the metal oxide to the adsorbent 10 causes a function of transferring heat generation of the activated carbon during adsorption of the evaporated fuel to the metal oxide to be improved, the temperature rise of the activated carbon to be suppressed, and the adsorption performance of the adsorbent 10 to be improved. In contrast, during purging of the fuel adsorbed, the function of the activated carbon to draw the potential heat of the metal oxide is improved. Thus, a temperature drop of the activated carbon is suppressed, and the purge performance of the adsorbent 10 is improved. Particularly, a metal oxide having a higher volume specific heat and thermal conductivity than those of the activated carbon as described above is used as the temperature control material to thereby enable the adsorption performance and purge performance to be improved.

In the adsorbent 10, the metal oxide also has a function of enhancing the hardness or rigidity of the adsorbent 10 as described above, and it is thus preferable that the ratio of the metal oxide added with respect to the raw materials be determined in consideration of a balance with a function as the temperature control material. When the amount of the metal oxide is extremely small, not only does the hardness or rigidity decreases but also the adsorption performance and purge performance decreases. In contrast, when the amount of the metal oxide is extremely large, the proportion of the activated carbon contained becomes lower, and the adsorption performance decreases. For example, in the above adsorbent 10, the outer wall 10A and ribs 10B are formed thin, and thus, the amount of the metal oxide added to the adsorbent 10 can be determined while maintaining of the hardness or rigidity is prioritized. For example, adding the metal oxide at 10% by mass or more and 70% by mass or less with respect to the adsorbent 10 enables the rigidity of the adsorbent 10 to be enhanced. Simultaneously, the presence of the metal oxide suppresses a temperature rise and a temperature drop to thereby enable the adsorption performance and purge performance to be improved. As described above, in combination with the fact that the thickness of the outer wall 10A and the plurality of ribs 10B is as relatively thin as less than 0.6 mm, the purge performance can be improved, and further, the adsorption performance also can be improved.

The temperature control material is only required to have a higher volume specific heat and thermal conductivity than those of the activated carbon, is not limited to metal oxides, and may be an inorganic oxide of silicon or the like.

Alternatively, as the temperature control material, instead of the metal oxide, at least either of a phase change material and a phase transition material can be used. The phase change material and phase transition material are materials having a higher thermal capacity than that of the activated carbon. For example, it is preferable that the materials be added such that the volume specific heat of the adsorbent 10 reaches 0.08 kcal/L·° C. or more at the phase change temperature of the phase change material and the phase transition temperature of the phase transition material.

The above phase change material and phase transition material are materials of which phase changes and transits at a predetermined phase change temperature and phase transition temperature, and are materials having similar action to that of the above-described metal oxide. In other words, the heat generation of the activated carbon during adsorption of evaporated fuel is transferred to the phase transition material. Thus, the temperature rise of the activated carbon is suppressed, and the adsorption performance of the adsorbent 10 is improved. In contrast, the activated carbon draws the potential heat of the phase transition material during purging of the fuel adsorbed. Then, a temperature drop of the activated carbon is suppressed, and the purge performance of the adsorbent 10 is improved.

In combination with the fact that the phase change material and phase transition material have a relatively large amount of latent heat, the adsorption performance and purge performance of the adsorbent including at least either of the phase change material and phase transition material as described above can be improved.

It is preferable that the phase change temperature of the phase change material and the phase transition temperature of the phase transition material be 36° C. or less. It is also preferable that the phase change material and phase transition material be in a capsular form.

The phase change material is not particularly limited as long as it is a material that can undergo a phase change between the solid phase and the liquid phase according to changes in the temperature of the activated carbon, and an organic compound or an in organic compound can be used. Specific examples include linear aliphatic hydrocarbons such as tetradecane, pentadecane, hexadecane, heptadecane, octadecane, nonadecane, eicosane, heneicosane, and docosane; natural wax; petroleum wax; hydrates of inorganic compounds such as $LiNO_3 \cdot 3H_2O$, $Na_2SO_4 \cdot 10H_2O$, and $Na_2HPO_4 \cdot 12H_2O$; fatty acids such as capric acid, lauric acid, palmitic acid, and myristic acid; higher alcohols that have 12 to 15 carbon atoms; and ester compounds such as methyl palmitate, methyl stearate, isopropyl palmitate, butyl stearate, stearyl stearate, and myristyl myristate.

Accordingly, when a phase change material is used, adjusting the type and amount added of the phase change material enables the volume specific heat of the adsorbent 10 at the phase change temperature to be 0.08 kcal/L·° C. or more.

Examples of the phase transition material include alloys of vanadium dioxide and tungsten ($V_xW_yO_2$) (X+Y=1). An example thereof is an alloy of vanadium dioxide and tungsten ($V_{0.98}W_{0.02}O_2$), wherein X=0.98 (98 parts by mass) and Y=0.02 (2 parts by mass). In this case, the phase transition temperature of the phase transition material ($V_{0.98}W_{0.02}O_2$) is 20° C., and the volume specific heat of the adsorbent 10 at the phase transition temperature of the phase transition material can be, for example, 0.08 kcal/L·° C. or more.

In the phase transition material made of the alloy of vanadium dioxide and tungsten described above, reducing Y (content ratio of tungsten) to less than Y=0.02 (2 parts by mass) enables the phase transition temperature to be adjusted to more than 20° C. Further, reducing Y (content ratio of tungsten) also enables the phase transition temperature to be adjusted to more than 20° C. and 36° C. or less. Inversely, raising Y (content ratio of tungsten) to more than Y=0.02 (2 parts by mass) enables the phase transition temperature to be adjusted to less than 20° C. Adjusting Y (content ratio of tungsten) in this manner enables the volume specific heat of the adsorbent 10 at the phase transition temperature to be 0.08 kcal/L·° C. or more, for example. When a phase transition material is used, adjusting the type and amount added to the adsorbent 10 of the phase transition material enables the volume specific heat of the adsorbent 10 at the phase transition temperature to be 0.08 kcal/L·° C. or more, for example.

It is preferable that the mass of at least either of the phase change material and phase transition material in the raw materials be 5% by mass or more and 30% by mass or less based on the mass of the activated carbon.

Here, heat is drawn when the evaporated fuel is desorbed from the activated carbon. Thus, the temperature of the activated carbon decreases, and the purge performance of the activated carbon is degraded. For example, when the temperature of the activated carbon falls below 10° C., the purge performance is markedly degraded. Since additive materials such as the phase change material and phase transition material respectively having a phase change temperature and phase transition temperature of 36° C. or less are included in the above adsorbent 10, an excessive drop of the temperature of the activated carbon included in the adsorbent 10 is suppressed, and purge processing is appropriately conducted.

Setting the ratio of the phase change material, phase transition material, and the like added to 5% by mass or more and 30% by mass or less based on the mass of the activated carbon enables the temperature of the activated carbon to be adjusted to an appropriate temperature. For example, when the ratio thereof added is less than 5% by mass, the effect of the phase change material, phase transition material, and the like to suppress an excessive drop of the temperature of the activated carbon is not sufficient. In contrast, when the ratio thereof added exceeds 30% by mass, addition of the phase change material, phase transition material, and the like makes the ratio of the activated carbon in the adsorbent smaller, and thus, the adsorption performance is degraded.

(d) Meltable Cores

Meltable cores may be added as an additive material to the raw materials of the adsorbent 10.

A material that has a high melting point and is easily decomposed is used as the meltable cores, which are sublimated or sublimated and vaporized by drying or the like at a predetermined temperature. When the raw materials including the meltable cores is dried or the like, the meltable cores are sublimated or decomposed and vaporized to thereby cause second pores to be formed. The second pores are formed to have a diameter and length comparable to those of the meltable cores. For example, the second pores are pores having a size of 1 µm or more. Such second pores, which serve as paths through which the evaporated fuel and purge air flow, can improve the adsorption performance and purge performance.

As the meltable cores, polymers are used such as polyester, polypropylene, polymethyl methacrylate, pulp fiber, amide fiber, and cellulose fiber. More preferably, polymethyl methacrylate, polyethylene, pulp fiber, and the like may be used as the meltable cores.

In the adsorbent 10 of the present embodiment, purge air flows through the plurality of cells 10C and penetrates through the outer wall 10A and ribs 10B having a small thickness, and thus, the purge performance is high. Likewise, evaporated fuel flows through the plurality of cells 10C and penetrates through the outer wall 10A and ribs 10B having a small thickness, and thus, the adsorption performance also can be improved. Accordingly, polyethylene, pulp fiber, and the like are made into a powder form, and second pores having a small length can be formed. In other words, penetration of the evaporated fuel and purge air can be improved even if the length of the second pores is not enlarged. Thus, a decrease in the hardness or rigidity of the adsorbent 10 can be suppressed by shortening the length of the second pores.

The pore diameter of the second pores is 1 µm or more and preferably 1 µm or more and 100 µm or less. Since the pore diameter of the second pores is within such a range, a decrease in the hardness or rigidity of the adsorbent can be suppressed. When the pore diameter of the second pores exceeds 100 µm, the second pores in the adsorbent becomes excessively large. Then, the rigidity cannot be maintained, and thus, practicability as an adsorbent is lacking.

The pore diameter of the second pores is preferably 1 µm or more and 60 µm or less and more preferably 1 µm or more and 50 µm or less.

When the diameter of the second pores is less than 1 µm, flow-through of the evaporated fuel and air during purging is poor, the desorption/adsorption rate becomes lower, and the purge performance is degraded. In contrast, when the diameter of the second pores exceeds 100 µm, the volume of the second pores present in the skeleton of the adsorbent 10 is expanded, and the hardness or rigidity of the adsorbent 10 decreases.

When the meltable cores are of pulp fiber, it is preferable the length be 0.5 mm or less.

It is also preferable that the meltable cores has a C—N bond. When the adsorbent 10 is formed, kneading and heating meltable cores having a C—N bond, activated carbon, additive materials, and the like causes the C—N bond of the meltable cores to be cut, and the meltable cores are easily decomposed and vaporized. Thereby, second pores derived from the fibrous meltable cores having a C—N bond can be formed in the adsorbent 10. The presence of the C—N bond enables clogging of the second pores due to generation of carbide on heating to be suppressed.

When the adsorbent 10 is formed to include the above meltable core, pores including first pores of less than 100 nm possessed by the activated carbon and second pores of 1 µm or more derived from the meltable cores are formed in the adsorbent 10. More specifically, as shown in FIG. 1, the molded body of the adsorbent 10 is formed of a skeleton formed of the outer wall 10A and ribs 10B, having first pores of less than 100 nm derived from the activated carbon and second pores of 1 µm or more derived from the meltable cores. Such an adsorbent 10 can capture butane and the like in evaporated fuel at a molecular level by the first pores of less than 100 nm to thereby enable the adsorption performance to be improved. The second pores of 1 µm or more, which serve as paths through which the evaporated fuel and purge air flow, can improve the adsorption performance and purge performance (4) Further Configurations of Adsorbent Honeycomb Pellets Among the adsorbents 10 of the above embodiment (the outer diameter D is, for example, more than 3.5 mm and 40 mm or less, and the length in the longitudinal direction L is, for example, 200 mm or less), also in relatively small honeycomb pellets in which the outer diameter D of the adsorbent 10 is, for example, more than 3.5 mm and 10 mm or less, the thickness of the outer wall 10A and ribs 10B can be made smaller. That is, the thickness dα of the outer wall 10A and the thickness dβ of the ribs 10B are less than 0.6 mm, and at least either thickness of the thickness dα of the outer wall 10A and the thickness dβ of the ribs 10B exceeds 0.4 mm.

Thereby, the purge performance and DBL performance can be improved also in relatively small honeycomb pellets. The adsorption performance also can be improved in relatively small honeycomb pellets.

(b) Honeycomb Adsorbent

Among the adsorbents 10 of the above embodiment, also in a honeycomb adsorbent in which the outer diameter D of the adsorbent 10 is, for example, more than 10 mm and 40 mm or less, the thickness of the outer wall 10A and ribs 10B can be made smaller. That is, the thickness dα of the outer wall 10A and the thickness dβ of the ribs 10B are less than 0.6 mm, and at least either thickness of the thickness dα of the outer wall 10A and the thickness dβ of the ribs 10B exceeds 0.4 mm.

Thereby, the purge performance and DBL performance can be improved and likewise, the adsorption performance can be improved, also in a relatively large honeycomb adsorbent. Further, when the outer diameter D of the honeycomb adsorbent is made as relatively large as more than 10 mm and 40 mm or less, the inner space to be formed by the outer wall becomes larger, and cells 10C of, for examples, 200 cells/inch$^2$ or more can be formed in this inner space, as viewed in the axis direction. Thus, the number of ribs increases in accordance with the number of the cells, and the external pressure, internal pressure, and the like to be applied on the adsorbent 10 can be dispersed by the ribs 10B. Then, the rigidity of the adsorbent 10 can be maintained even when the thickness dα of the outer wall 10A and the thickness dβ of the ribs 10B are set to less than 0.45 mm.

(c) Adsorbent Including Metal Oxide

When a metal oxide of 10% by mass or more and 70% by mass or less with respect to the adsorbent 10 is included, the thickness dα of the outer wall 10A and the thickness dβ of the ribs 10B can be set to less than 0.6 mm. The outer diameter D, as in the adsorbent 10 of the above embodiment, is, for example, more than 3.5 mm and 40 mm or less, and the length in the longitudinal direction L is, for example, 200 mm or less. Although the external pressure, internal pressure, and the like to be applied on the adsorbent 10 are dispersed by the plurality of ribs to thereby enhance the rigidity of the adsorbent 10, inclusion of the metal oxide at 10% by mass or more and 70% by mass or less with respect to the adsorbent 10 allows the rigidity to be further enhanced, in addition to thermal control during adsorption and desorption by a high thermal capacity per volume of the metal oxide. When the rigidity of the adsorbent 10 can be enhanced, the thickness dα of the outer wall 10A and the thickness dβ of the ribs 10B can be preferably set to less than 0.44 mm, more preferably set to 0.4 mm or less, and further preferably set to 0.3 mm or less. In consideration of a decrease in the rigidity of the adsorbent 10, the thicknesses can be set to 0.15 mm or more and more preferably set to 0.23 mm or more. Enhancing the rigidity of the adsorbent 10 in this manner enables the thickness of the outer wall and plurality of ribs to be smaller, the purge performance and DBL performance to be further improved, and also the adsorption performance to be improved, likewise.

(d) BWC

In the above description, the BWC was caused to exceed 3.0 g/dL. When the BWC becomes excessively large, the purge performance and DBL performance are degraded. Thus, it is preferable that the BWC be 13.0 g/dL or less. In order to suppress degradation of the purge performance and DBL performance, the BWC is more preferably 11.0 g/dL or less.

(e) Purge Efficiency

The purge efficiency of the above adsorbent 10 is 0.86 or more, preferably 0.88 or more, and more preferably 0.9 or more. When the purge efficiency falls below 0.86, the DBL performance is degraded.

(f) Number of Cells and Number of Ribs

In the above adsorbent 10, when the thickness dα of the outer wall 10A and the thickness dβ of the ribs 10B are made thin as described above, for example, cells 10C of 200 cells/inch$^2$ or more can be formed, as viewed in the axis direction, in the inner space to be surrounded by the outer wall 10A. Preferably, the cells 10C of 200 cells/inch$^2$ or more can be formed. The cells 10C of 300 cells/inch$^2$ or more can be also preferably formed, the cells 10C of 500 cells/inch$^2$ or more can be more preferably formed, the cells 10C of 600 cells/inch$^2$ or more can be more preferably formed, and the cells 10C of 700 cells/inch$^2$ or more can be further preferably formed. Forming the plurality of cells 10C in this manner allows the number of ribs to be at least 4 or more. The number of ribs increases in accordance with a large number of cells, the external pressure, internal pressure, and the like to be applied on the adsorbent 10 can be dispersed by the plurality of ribs 10B, and the rigidity of the adsorbent 10 can be maintained.

In consideration of the ease with which purge air flows through inside the cells 10C, the rigidity of the outer wall 10A and ribs 10B, and the like, it is preferable to set the number of cells to 800 cells/inch$^2$ or less so as to suppress the thickness dα of the outer wall 10A and the thickness dβ of the ribs 10B within the above range. Likewise, in consideration of the ease with which evaporated fuel flows through, it can be said that it is preferable to set the number of cells to 800 cells/inch$^2$ or less.

(g) Difference of Amount of Equilibrium Adsorption

In the above adsorbent 10, it is preferable that the difference of the amount of equilibrium adsorption of n-butane concentrations between n-butane concentrations of 5 vol % and 50 vol % exceed 35 g/L. In this case, due to the large effective amount to be adsorbed of molecules such as butane and the like in the evaporated fuel, it is possible to improve the adsorption performance of the adsorbent 10. Thereby, size and weight reduction of the adsorbent 10 can be achieved.

(h) Volume of Second Pores

When the above adsorbent 10 is configured to include meltable cores in the raw materials, first pores of less than 100 nm derived from the activated carbon and second pores of 1 μm or more derived from the meltable cores are formed. Here, it is preferable that the volume of the second pores be more than 0.05 mL/g and 0.35 mL/g or less with respect to the mass of the adsorbent 10. This case is preferable because the evaporated fuel and purge air easily flow through the second pores and the adsorption performance, purge performance, and DBL performance are improved.

The ratio of the volume of the second pores is more preferably 0.1 mL/g or more and further preferably 0.15 mL/g or more with respect to the mass of the adsorbent 10.

(i) Adsorption Functional Material

In the above description, the activated carbon was allowed to be included in the raw materials of the adsorbent 10. However, when molecules such as butane and the like in evaporated fuel can be adsorbed in the adsorbent 10, activated carbon, activated alumina, silica gel, zeolite, an organic metal complex, a silica porous body, and the like or a mixture thereof may be included in the raw materials of the adsorbent 10. However, for example, activated carbon, activated alumina, or a mixture thereof can be preferably used, and it is more preferable to use activated carbon.

(4) Canister

Next, a canister 100 in which the above adsorbent 10 is employed will be described with reference to FIG. 4. The canister 100 is disposed for use in treatment of evaporated fuel generated from a fuel tank of an automobile. The canister 100 is configured to have a case 21, a cover 22, a plate 28, coil springs 29, and filters F. An adsorbent chamber R is formed inside the canister 100, and the adsorbent 10 for canister produced above will be accommodated therein.

The case 21 is a hollow cylindrical member made of a synthetic resin (e.g., nylon), the bottom of which member is open. The cover 22 is a disk-shaped member made of a synthetic resin (e.g., nylon). The cover 22 is bonded to the lower side of the case 21 by, for example, vibration welding or adhesion to thereby close the opening of the case 21.

On the upper side of the case 21, a tank port 23, a purge port 24, and an atmospheric air port 25 are formed. The tank port 23 is in communication with an upper portion of the fuel tank (not shown) of the automobile, and evaporated fuel to be generated from the fuel tank flows into the case 21 through the tank port 23. The purge port 24 is in communication with an air intake path (not shown) of an internal combustion engine. The air intake path is in communication with an air intake pipe of the internal combustion engine, or is connected to a suction pump that is driven and controlled independently of the running of the engine. The atmospheric air port 25 is open to atmospheric air, and atmospheric air flows into the case 21 through the atmospheric air port 25.

Inside the case 21, a partition wall 26 and an auxiliary partition wall 27 are formed. The partition wall 26 is a partition wall that extends from the inner upper end of the case 21 to the vicinity of the cover 22, and is located at a position between the purge port 24 and the atmospheric air port 25. The auxiliary partition wall 27 is a short partition wall that extends from the inner upper end of the case 21 toward the cover 22, and is located at a position between the tank port 23 and the purge port 24.

The internal space of the case 21 is divided horizontally by the partition wall 26. Then, the space on the right in the figure (space on the side of the atmospheric air port 25) is partitioned vertically by the filters F. Of this space on the side of the atmospheric air port 25, the lower-side space (space on the side of the cover 22) is referred to as a second region 32, and the upper-side space (space on the side of the atmospheric air port 25) is referred to as a third region 33. The space on the side of the tank port 23, divided by the partition wall 26, is referred to as a first region 31. In the present embodiment, the above adsorbent 10 for canister is provided in the third region 33, and activated carbon is disposed in the first region 31 and the second region 32.

The filters F disposed between the first region 31 and the second region 32 are filters made of a synthetic resin non-woven fabric or made of foamed urethane, and are configured to allow evaporated fuel and air to pass therethrough. The plate 28 is disposed in the lower portions of the first region 31 and the second region 32. The plate 28 is a metal plate in which a plurality of through holes are formed, and are configured to allow evaporated fuel and air to pass therethrough. The plate 28 is biased upward by the coil springs 29, and thus, the adsorbent 10 for canister and the activated carbon enclosed in the first region 31, second region 32, and third region 33 are compressed upward.

With the configuration described above, inside the canister 100, a U-shaped flow path extending between the tank port 23 (and the purge port 24) and the atmospheric air port 25 is formed. The evaporated fuel flowing from the tank port 23 first flows into the first region 31, passes under the plates 28, flows into the second region 32, and flows into the third region 33. The first region 31, second region 32, and third region 33 are regions that adsorb the evaporated fuel flowing from the tank port 23 to the atmospheric air port 25. The regions accommodate the activated carbon and adsorbent 10 for canister and hereinafter may be collectively referred to as the adsorbent material chamber R. The first region 31 is adjacent to the tank port 23 and may be referred to as a tank-side adjacent region T. The third region 33 is adjacent to the atmospheric air port 25 and may be referred to as an atmospheric air-side adjacent region U.

As described above, in the present embodiment, the above adsorbent 10 for canister is provided in the atmospheric air-side adjacent region U as the third region 33. Desorption (purge) of the evaporated fuel from the activated carbon (adsorbent body) included in the adsorbent 10 for canister is conducted by inflow of atmospheric air from the atmospheric air port 25 due to intake from the purge port 24. The above adsorbent 10 for canister is excellent in purge performance because the thickness of the outer wall 10A and ribs 10B is made relatively thin. Accordingly, providing the above adsorbent 10 for canister in the atmospheric air-side adjacent region U in the canister 100 enables the purge performance of the canister to be improved.

A case where at least any additive material of a metal oxide, a phase change material, and a phase transition material is included in the adsorbent for canister is preferable because a temperature rise and a temperature drop of the adsorbent body such as the activated carbon can be suppressed. In other words, heat is drawn when the evaporated fuel is desorbed from the adsorbent body such as the activated carbon, and thus, the temperature of the adsorbent body decreases, and the purge performance is degraded. For example, when the temperature of the activated carbon as the adsorbent body falls below 10° C., the purge performance is markedly degraded. According to the above configuration, since the above-described adsorbent 10 for canister is provided in the atmospheric air-side adjacent region U adjacent to the atmospheric air port 25 in the adsorbent chamber R, an excessive drop of the temperature of the activated carbon included in the adsorbent 10 for canister in the atmospheric air-side adjacent region U is suppressed, and purge processing is appropriately conducted.

In the present embodiment, although the above adsorbent 10 for canister may be provided in the atmospheric air-side adjacent region U, the above adsorbent 10 for canister can be provided also in the tank-side adjacent region T.

Second Embodiment

Next, a canister and an adsorbent for use in the canister according to a second embodiment will be described. The adsorbent 10 according to the second embodiment is partially different in the constituents of the raw materials from those of the adsorbent 10 according to the first embodiment, and the production method and the like thereof are different. Mainly the differences are described, and description of others such as the external configuration of the adsorbent and application to the canister, which are the same as those of the first embodiment, is omitted.

The adsorbent 10 according to the second embodiment is formed of raw materials including at least activated carbon having first pores, an organic binder, and an inorganic material. In other words, a crosslinking agent is included in the raw materials in the adsorbent 10 according to the first embodiment, but in the adsorbent 10 according to the second embodiment, a crosslinking agent is not an essential material to be added to the raw materials.

Such raw materials are formed as the adsorbent 10 via a firing step. In the first embodiment, mainly the organic binder and the crosslinking agent function as a binder constituting the adsorbent 10 as a molded body, but in the second embodiment, mainly the inorganic material functions as a binder constituting the adsorbent 10 as a molded body.

A method for producing the adsorbent 10 according to the second embodiment is as follows. The raw materials including the activated carbon, organic binder, and inorganic material described above are mixed with water and kneaded using a mixer such as a ribbon mixer. Then, the kneaded material kneaded is molded by extrusion, mold molding, or the like into a honeycomb shape as shown in FIG. 1 to FIG. 3. Thereafter, the molded material is dried using infrared, hot air, steam, microwaves, or the like at about 200° C. or less, for example, about 120° C. for about three hours. Subsequently, the molded body is fired with a belt kiln or the like under an inert gas atmosphere at 650° C. to 1000° C., for example, 800° C. for about three hours to thereby produce the adsorbent 10.

The drying at a relatively low temperature of about 200° C. or less, for example, about 120° C. and firing at a relatively high temperature of 650° C. to 1000° C. may be, for example, a step of extracting water from the molded body during molding, a step of solidifying the inorganic material, and the like.

As the organic binder, in the present embodiment, since the firing step is conducted in production of the adsorbent 10, an organic binder for use in molding common honeycombs can be used. As the organic binder, for example, carboxymethyl cellulose, methyl cellulose, hydroxypropyl methyl cellulose, hydroxyethyl methyl cellulose, and the like can be used. The amount of such an organic binder added is of the order of 3 to 15% by mass based on the total mass of the raw materials for use in production of the adsorbent 10.

As described above, in the step of forming the adsorbent 10 according to the second embodiment, the molding step is included. When meltable cores are included in the raw materials of the adsorbent 10 according to the second embodiment, the drying at a relatively low temperature and firing at relatively high temperature may be a step of sublimating a sublimable material such as the meltable cores.

In addition, the fact that a carbonized product, a metal oxide, a temperature control material, meltable cores, and the like may be included in the raw materials of the adsorbent 10 according to the second embodiment is the same as for the adsorbent 10 of the first embodiment above. Further configurations applicable to the adsorbent 10 described in the first embodiment are also applicable to the adsorbent 10 according to the second embodiment. The adsorbent 10 according to the second embodiment is applicable to canisters as that of the first embodiment.

EXAMPLES AND COMPARATIVE EXAMPLES OF ADSORBENT

Hereinafter, adsorbents according to Examples and Comparative Examples were produced, and the results of Table 1 to Table 3 were provided.

In Examples and Comparative Examples below, the quantity of each raw material is described as the absolute amount (g), but the quantity of each raw material is not limited thereto and can be replaced by the relative amount (parts by mass).

Example 1

Raw materials including 53 g of activated carbon having a BWC of 15, 6.5 g of CMC as an organic binder, 1 g of an oxazoline group-containing polymer as a crosslinking agent, 25 g of bentonite as an inorganic material, and 14.5 g of a carbonized product of palm shells were mixed with water and kneaded using a mixer. The kneaded material kneaded was molded with an extruder such that each cell 10C was triangular-shaped as viewed in the axis direction, and dried at 120° C. for three hours to thereby provide an adsorbent.

The adsorbent has an outer diameter of 6 mm, a thickness of the outer wall of 0.59 mm, a thickness of the ribs of 0.27 mm, and the number of cells of 700 cells/inch$^2$ as viewed in the axis direction.

Example 2

An adsorbent was provided using the same raw materials and in the same manner as in Examples 1 except that 14.5 g of bentonite as the inorganic material and 25 g of $Fe_2O_3$ as the metal oxide were added to and no carbonized product of palm shell was added to the raw materials.

Example 3

An adsorbent was provided using the same raw materials and in the same manner as in Examples 1 except that 4.5 g of a carbonized product of palm shells and 10 g of 7-μm microcapsules including hexadecane enclosed therein and having melamine coating as a phase change material were added to the raw materials.

Example 4

An adsorbent was provided using the same raw materials and in the same manner as in Examples 3 except that 10 g of a phase transition material ($V_{0.98}W_{0.02}O_2$) was added instead of the phase change material to the raw materials.

Example 5

The same raw materials as in Example 1 were used except that 20 g of polyethylene (PE) as meltable cores and 15.5 g of a carbonized product of palm shells were added to and no crosslinking agent was added to the raw materials. The kneaded material obtained by mixing and kneading the raw materials with water using a mixer was molded with an extruder such that each cell 10C was triangular-shaped as viewed in the axis direction, and dried at 120° C. for three hours. Thereafter, the molded body was fired at 800° C. for about three hours to thereby provide an adsorbent.

Example 6

An adsorbent was provided using the same raw materials and in the same manner as in Examples 5 except that 25 g of $Fe_2O_3$ as the metal oxide was added to and no carbonized product of palm shell was added to the raw materials.

Example 7

The same raw materials as in Example 1 were used except that 59 g of activated carbon having a BWC of 15 and 19 g of bentonite as the inorganic material were added to the raw materials, and mixed with water and kneaded using a mixer. The kneaded material kneaded was molded with an extruder such that each cell 10C was hexagonal-shaped as viewed in the axis direction, and dried at 120° C. for three hours to thereby provide an adsorbent.

The adsorbent has an outer diameter of 36 mm, a thickness of the outer wall of 0.42 mm, a thickness of the ribs of 0.19 mm, and the number of cells of 600 cells/inch$^2$.

Example 8

The same raw materials as in Example 7 were used except that 53 g of activated carbon having a BWC of 15 and 25 g of bentonite as the inorganic material were added to the raw materials. An adsorbent was provided using the same manner as in Example 7 except that the adsorbent was produced so as to have an outer diameter of 36 mm, a thickness of the outer wall of 0.5 mm, a thickness of the ribs of 0.25 mm, and the number of cells of 300 cells/inch$^2$.

Example 9

Raw materials including 53 g of activated carbon having a BWC of 15, 6.5 g of CMC as an organic binder, 25 g of bentonite as an inorganic material, and 53 g of $Fe_2O_3$ as a metal oxide were mixed with water and kneaded using a mixer. The kneaded material kneaded was molded with an extruder such that each cell 10C was rectangular-shaped as viewed in the axis direction, and dried at 120° C. for three hours to thereby provide an adsorbent.

The adsorbent has an outer diameter of 4 mm, a thickness of the outer wall of 0.3 mm, a thickness of the ribs of 0.25 mm, and the number of cells of 600 cells/inch$^2$.

Example 10

Raw materials including 41 g of activated carbon having a BWC of 17, 6.5 g of CMC as an organic binder, 14 g of bentonite as an inorganic material, 21 g of $Fe_2O_3$ as a metal oxide, and 6.5 g of polyethylene (PE) as meltable cores were mixed with water and kneaded using a mixer. The kneaded material kneaded was molded with an extruder such that each cell 10C was hexagonal-shaped as viewed in the axis direction, and dried at 120° C. for three hours to thereby provide an adsorbent.

The adsorbent has an outer diameter of 36 mm, a thickness of the outer wall of 0.55 mm, a thickness of the ribs of 0.42 mm, and the number of cells of 300 cells/inch².

Example 11

An adsorbent was provided using the same raw materials and in the same manner as in Example 10 except that 47 g of activated carbon having a BWC of 17 was used in the raw materials.

The adsorbent of Example 11 has an outer diameter of 36 mm, a thickness of the ribs of 0.42 mm, and the number of cells of 300 cells/inch² as in Example 10 except that the thickness of the outer wall is 0.45 mm.

Example 12

An adsorbent was provided using the same raw materials and in the same manner as in Example 10 except that 49 g of activated carbon having a BWC of 17 was used in the raw materials.

The outer diameter, thickness of the outer wall, thickness of the ribs, and number of cells of the adsorbent of Example 12 are equivalent to those of the adsorbent of Example 11.

Example 13

An adsorbent was provided using the same raw materials and in the same manner as in Example 12 except that 6.5 g of polymethyl methacrylate (PMMA) having an average particle size of 1.5 μm as the meltable cores was used in the raw material.

The outer diameter, thickness of the outer wall, thickness of the ribs, and number of cells of the adsorbent of Example 13 are equivalent to those of the adsorbent of Example 11.

The average particle size refers to a particle size measured by a laser diffraction scattering method.

Comparative Example 1

A kneaded material obtained by using the same raw materials as those of Example 1 was used and molded with an extruder such that each cell 10C was rectangular-shaped as viewed in the axis direction, and dried at 120° C. for three hours to thereby provide an adsorbent.

The adsorbent has an outer diameter of 6 mm, a thickness of the outer wall of 0.8 mm, a thickness of the ribs of 0.44 mm, and the number of cells of 290 inch².

Comparative Example 2

An adsorbent was provided using the same raw materials and in the same manner as in Comparative Example 1 except that 56 g of activated carbon having a BWC of 11 and 11.5 g of a carbonized product of palm shells were added to the raw materials.

Comparative Example 3

The same raw materials as in Comparative Example 1 were used except that 50 g of activated carbon having a BWC of 13, 37 g of bentonite as the inorganic material, and 13 g of polyethylene (PE) as the meltable cores were added to and CMC as the organic binder, a crosslinking agent, and a carbonized product of palm shells were not added to the raw materials. An adsorbent was provided using the same manner as in Comparative Example 1 except that the adsorbent was produced so as to have an outer diameter of 4.9 mm, a thickness of the outer wall of 0.8 mm, a thickness of the ribs of 0.7 mm, and the number of cells of 200 cells/inch².

Comparative Example 4

The same raw materials as in Comparative Example 1 were used except that 75 g of activated carbon having a BWC of 11, 10 g of CMC as the organic binder, and 15 g of bentonite as the inorganic material were added to and no carbonized product of palm shells was added to the raw materials. An adsorbent was provided using the same manner as in Comparative Example 1 except that the adsorbent was produced so as to have an outer diameter of 4 mm, a thickness of the outer wall of 0.28 mm, a thickness of the ribs of 0.29 mm, and the number of cells of 500 cells/inch.

Comparative Example 5

The same raw materials as in Comparative Example 1 were used. An adsorbent was provided using the same manner as in Comparative Example 1 except that the adsorbent was produced so as to have an outer diameter of 6 mm, a thickness of the outer wall of 0.4 mm, a thickness of the ribs of 0.3 mm, and the number of cells of 500 cells/inch².

The physical property values shown in Table 1 to Table 3 were obtained for each of the adsorbents produced in the above Examples and Comparative Examples.

Among the physical property evaluations of Table 1 to Table 3, "BWC", "difference of amount of equilibrium adsorption between butane concentrations of 5 vol % and 50 vol %", "purge efficiency", "B.R", "hardness", and "volume of second pores (pore diameter of 100 nm or more)/mass of adsorbent" are evaluation values for each adsorbent 10 of Examples 1 to 13 and Comparative Examples 1 to 5. Meanwhile, the DBL is an evaluation value for a canister in the case where each adsorbent 10 of Examples 1 to 13 and Comparative Examples 1 to 5 is provided in the third region 33 of the canister in FIG. 4.

TABLE 1

| | Example 1 | Example 2 | Example 3 | Example 4 | Example 5 | Example 6 | Example 7 | Example 8 | Example 9 |
|---|---|---|---|---|---|---|---|---|---|
| [Quantity of raw materials (unit:g)] | | | | | | | | | |
| Activated carbon | 53 (BWC15) | 53 (BWC15) | 53 (BWC15) | 53 (BWC15) | 53 (BWC15) | 53 (BWC15) | 59 (BWC15) | 53 BWC15) | 53 (BWC15) |
| CMC | 6.5 | 6.5 | 6.5 | 6.5 | 6.5 | 6.5 | 6.5 | 6.5 | 6.5 |
| Crosslinking agent | 1 | 1 | 1 | 1 | 0 | 0 | 1 | 1 | 0 |
| Inorganic material | 25 | 14.5 | 25 | 25 | 25 | 25 | 1.19 | 25 | 25 |
| Carbonized product | 14.5 | 0 | 4.5 | 4.5 | 15.5 | 0 | 14.5 | 14.5 | 0 |

TABLE 1-continued

|  | Example 1 | Example 2 | Example 3 | Example 4 | Example 5 | Example 6 | Example 7 | Example 8 | Example 9 |
|---|---|---|---|---|---|---|---|---|---|
| Metal oxide ($F_2O_3$) | 0 | 25 | 0 | 0 | 0 | 25 | 0 | 0 | 53 |
| Phase change material (C16 capsule) | 0 | 0 | 10 | 0 | 0 | 0 | 0 | 0 | 0 |
| Phase transititon material ($V_{0.98}W_{0.02}O_2$) | 0 | 0 | 0 | 10 | 0 | 0 | 0 | 0 | 0 |
| Meltable core (PE) | 0 | 0 | 0 | 0 | 20 | 20 | 0 | 0 | 0 |
| [Adsorbent] |  |  |  |  |  |  |  |  |  |
| Cell shape | Triangular cell | Triangular cell | Triangular cell | Triangular cell | Triangular cell | Triangular cell | Hexagonal cell | Hexagonal cell | Rectangular cell |
| Outer diameter D (mm) | 6 | 6 | 6 | 6 | 6 | 6 | φ 36 | φ 36 | 4 |
| Thickness dα of the outer wall | 0.59 | 0.59 | 0.59 | 0.59 | 0.59 | 0.59 | 0.42 | 0.5 | 0.3 |
| Thickness of dβ of ribs (mm) | 0.27 | 0.27 | 0.27 | 0.27 | 0.27 | 0.27 | 0.19 | 0.25 | 0.25 |
| Number of cells (cells/inches$^2$) | 700 | 700 | 700 | 700 | 700 | 700 | 600 | 300 | 600 |
| [Physical property evaluation] |  |  |  |  |  |  |  |  |  |
| BWC (g/dL) | 6.8 | 7.1 | 6.6 | 6.7 | 6.7 | 6.9 | 7 | 6.4 | 6.6 |
| Difference of amount of equilibrium adsorption between butane concentrations of 5 vol % and 50 vol % (g/L) | 38 | 40 | 37 | 37 | 36 | 39 | 39 | 36 | 37 |
| Purge efficiency | 0.91 | 0.92 | 0.92 | 0.91 | 0.92 | 0.93 | 0.89 | 0.89 | 0.94 |
| B.R | 0.7 | 0.7 | 0.7 | 0.8 | 0.6 | 0.5 | 0.9 | 1 | 0.5 |
| Hardness | AA | AA | AA | AA | A | A | A | A | A |
| DBL | A | AA | AA | AA | AA | AA | A | A | AA |
| Volume of second pores (pore diameter 100 nm or more)/ mass of adsorbent (mL/g) | — | — | — | — | 0.34 | 0.31 | — | — | — |

TABLE 2

|  | Example 10 | Example 11 | Example 12 | Example 13 |
|---|---|---|---|---|
| [Quantity of raw materials (unit: g)] |  |  |  |  |
| Activated carbon | 41 (BWC17) | 47 (BWC17) | 49 (BWC17) | 49 (BWC17) |
| CMC | 6.5 | 6.5 | 6.5 | 6.5 |
| Crosslinking agent | 0 | 0 | 0 | 0 |
| Inorganic material | 14 | 14 | 14 | 14 |
| Carbonized product | 0 | 0 | 0 | 0 |
| Metal oxide ($Fe_2O_3$) | 21 | 21 | 21 | 21 |
| Phase change material (C16 capsule) | 0 | 0 | 0 | 0 |
| Phase transition material ($V_{0.98}W_{0.02}O_2$) | 0 | 0 | 0 | 0 |
| Meltable core | 6.5 (PE) | 6.5 (PE) | 6.5 (PE) | 6.5 (average particle size 1.5 μm PMMA) |
| [Adsorbent] |  |  |  |  |
| Cell shape | Hexagonal cell | Hexagonal cell | Hexagonal cell | Hexagonal cell |
| Outer diameter D (mm) | φ 36 | φ 30 | φ 36 | φ 36 |
| Thickness dα of the outer wall (mm) | 0.55 | 0.45 | 0.45 | 0.45 |
| Thickness dβ of ribs (mm) | 0.42 | 0.42 | 0.42 | 0.42 |
| Number of cells (cells/inch$^2$) | 300 | 300 | 300 | 300 |
| [Physical property evaluation] |  |  |  |  |
| BWC (g/dL) | 9.2 | 9.5 | 10 | 10 |
| Difference of amount of equilibrium adsorption between butane concentrations of 5 vol % and 50 vol % (g/L) | 43 | 45 | 47 | 47 |
| Purge efficiency | 0.92 | 0.92 | 0.9 | 0.9 |
| B.R | 0.9 | 0.9 | 1 | 1 |
| Hardness | A | A | A | A |
| DBL | AA | AA | AA | AA |
| Volume of second pores (pore diameter 100 nm or more)/mass of adsorbent (mL/g) | 0.2 | 0.2 | 0.2 | 0.2 |

TABLE 3

|  | Comparative Example 1 | Comparative Example 2 | Comparative Example 3 | Comparative Example 4 | Comparative Example 5 |
|---|---|---|---|---|---|
| [Quantity of raw materials (unit: g)] | | | | | |
| Activated carbon | 53 (BWC15) | 56 (BWC11) | 50 (BWC13) | 75 (BWC11) | 53 (BWC15) |
| CMC | 6.5 | 6.5 | 0 | 10 | 6.5 |
| Crosslinking agent | 1 | 1 | 0 | 1 | 1 |
| Inorganic material | 25 | 25 | 37 | 15 | 25 |
| Carbonized product | 14.5 | 11.5 | 0 | 0 | 14.5 |
| Metal oxide ($Fe_2O_3$) | 0 | 0 | 0 | 0 | 0 |
| Phase change material (C16 capsule) | 0 | 0 | 0 | 0 | 0 |
| Phase transition material ($V_{0.98}\,W_{0.02}\,O_2$) | 0 | 0 | 0 | 0 | 0 |
| Meltable core | 0 | 0 | 13 | 0 | 0 |
| [Adsorbent] | | | | | |
| Cell shape | Rectangular cell | Rectangular cell | Rectangular cell | Rectangular cell | Rectangular cell |
| Outer diameter D (mm) | 6 | 6 | 4.9 | 4 | 6 |
| Thickness dα of the outer wall (mm) | 0.8 | 0.8 | 0.8 | 0.28 | 0.4 |
| Thickness dβ of ribs (mm) | 0.44 | 0.44 | 0.7 | 0.29 | 0.3 |
| Number of cells (cells/inch$^2$) | 290 | 290 | 200 | 500 | 500 |
| [Physical property evaluation] | | | | | |
| BWC (g/dL) | 6.8 | 5.7 | 7.5 | 7.1 | 6.3 |
| Difference of amount of equilibrium adsorption between butane concentrations of 5 vol % and 50 vol % (g/L) | 38 | 32 | 42 | 41 | 35 |
| Purge efficiency | 0.78 | 0.82 | 0.78 | 0.9 | 0.89 |
| B.R | 1.9 | 1.3 | 1.3 | 0.8 | 1 |
| Hardness | A | A | AA | C | B |
| DBL | C | C | C | A | B |
| Volume of second pores (pore diameter 100 nm or more)/mass of adsorbent (mL/g) | — | — | 0.24 | — | — |

Measurement of the BWC and various physical property values such as difference of the amount of equilibrium adsorption between butane concentrations of 5 vol % and 50 vol % and BR (Butane Retentivity) was conducted in compliance with ASTM D5228.

The purge efficiency was determined by the following equation:

$$\text{purge efficiency} = (\text{amount of butane adsorbed} - \text{amount of butane retained})/\text{amount of butane adsorbed} \quad (1).$$

The cumulative pore volume (mL/g) was determined by dividing the total amount of mercury intruded (mL) when a pressure of 1.7 psia to 27500 psia was applied in second pore analysis of the porous resin by the sample weight (g).

For the hardness or rigidity, the breaking strength was measured using a commercially available Kiya hardness tester.

When the adsorbent was the honeycomb pellets described above, the case of the breaking hardness of 15 N or more was evaluated as AA (Excellent), the case of 10 N or more and less than 15 was evaluated as A (Good), the case of 5 N or more and less than 10 N was evaluated as B (Below Average), and the case of less than 5 N was evaluated as C (Poor).

Meanwhile, when the adsorbent was the honeycomb adsorbent described above, the case of the breaking hardness of 50 N or more was evaluated as AA, the case of 30 N or more and less than 50 N was evaluated as A, the case of 10 N or more and less than 30 N was evaluated as B, and the case of less than 10 N was evaluated as C.

The DBL performance was evaluated as follows.

In accordance with US Bleed Emissions Test Procedure (BETP), determination was made using the purge amount when the amount of DBL emissions of the canister was less than 20 mg.

AA (Excellent) is the case where the amount of DBL emissions for two days was less than 20 mg when a purge of 100 BV (purge amount of 100 times the volume of the canister) or less was applied after a 40 g/hr butane loading step.

A (Good) is the case where the amount of DBL emissions for two days was less than 20 mg when a purge of 157 BV (purge amount of 157 times the volume of the canister) or less was applied after a 40 g/hr butane loading step.

B (Below Average) is the case where the amount of DBL emissions for two days was less than 20 mg when a purge of 210 BV (purge amount of 210 times the volume of the canister) or less was applied after a 40 g/hr butane loading step.

C (Poor) is the case where the amount of DBL emissions for two days was 20 mg or more when a purge of a purge of 210 BV (purge amount of 210 times the volume of the canister) or less was applied after a 40 g/hr butane loading step.

(Outer Diameter, Thickness of the Outer Wall, and Thickness of Ribs)

In Examples 1 to 6, the thickness dα of the outer wall 10A is 0.59 mm, in Example 7, the thickness dα of the outer wall 10A is 0.42 mm, and in Example 8, the thickness dα of the outer wall 10A is 0.5 mm.

In Examples 1 to 8, the BWC is 6.4 to 7.1 g/dL, and the difference of the amount of equilibrium adsorption between butane concentrations of 5 vol % and 50 vol % (hereinafter, simply referred to as the difference of the amount of equilibrium adsorption) is 36 to 40 g/L. In Examples 1 to 8, the purge efficiency is 0.89 to 0.93. The hardness in Examples 1 to 4 is as particularly excellent as AA, and the hardness in Examples 5 to 8 is as generally good as A. The DBL performance is as generally good as A in Examples 1, 7, and 8, and is as particularly good as AA in Examples 2 to 6.

The thickness dα of the outer wall 10A in Examples 10 is 0.55 mm, and the thickness dα of the outer wall 10A in Examples 11 to 13 is 0.45 mm.

In Examples 10 to 13, the BWC is 9.2 to 10 g/dL, and the difference of the amount of equilibrium adsorption is 43 to 47 g/L. In Examples 10 to 13, the purge efficiency is 0.9 to 0.92. In Examples 10 to 13, the hardness is as generally good as A, and the DBL performance is as particularly excellent as AA.

In contrast, in Comparative Examples 1 to 3, the thickness dα of the outer wall 10A is 0.8 mm.

In Comparative Examples 1 to 3, the BWC is 5.7 to 7.5 g/dL, and the difference of the amount of equilibrium adsorption is 32 to 42 g/L. In Comparative Example 1 to 3, the purge efficiency is 0.78 to 0.82. The hardness in Comparative Example 3 is as particularly excellent as AA, and the hardness in Comparative Examples 1 and 2 is as generally good as A. However, the DBL performance is as low as C in any of Comparative Examples 1 to 3.

From the above results, it can be seen that, in Examples 1 to 8 and 10 to 13, in which the thickness dα of the outer wall 10A is less than 0.6 mm, the BWC, difference of the amount of equilibrium adsorption, purge efficiency, hardness, DBL performance, and the like are excellent than those in Comparative Examples 1 to 3, in which the thickness dα of the outer wall 10A is 0.6 mm or more. Particularly, when the thickness dα of the outer wall 10A is 0.6 mm or more, it can be seen that the DBL performance decreases. In Comparative Example 2, the difference of the amount of equilibrium adsorption is 32 g/L, which is lower than that in Examples 1 to 8 and 10 to 13. The purge efficiency in Comparative Examples 1 to 3 is lower than the purge efficiency in Examples 1 to 8 and 10 to 13.

Accordingly, setting the thickness dα of the outer wall 10A to less than 0.6 mm in the adsorbent 10 is preferable because the purge efficiency and the like are excellent and, particularly, the DBL performance can be improved.

The thickness dα of the outer wall 10A in Comparative Example 4 is 0.28 mm, and the thickness dα of the outer wall 10A in Comparative Example 5 is 0.4 mm. In Comparative Examples 4 and 5, the BWC is 7.1 and 6.3, respectively, and the difference of the amount of equilibrium adsorption is 41 g/L and 35 g/L, respectively. The purge efficiency is 0.9 and 0.89, respectively. The hardness in Comparative Example 4 is as particularly poor as C, and the hardness in Comparative Example 5 is as slightly poor as B. The DBL performance in Comparative Example 4 is as generally good as A, but is as slightly poor as B in Comparative Example 5.

In contrast, in Example 7, the thickness dα of the outer wall 10A is 0.42 mm, the hardness is as generally good as A, and the DBL performance is as generally good as A. In Example 10, the thickness dα of the outer wall 10A is 0.55 mm, in Examples 11 to 13, the thickness dα of the outer wall 10A is 0.45 mm, and in Examples 7 and 10 to 13, the hardness is as generally good as A, and the DBL performance is as particularly excellent as AA. Accordingly, the thickness dα of the outer wall 10A exceeding 0.4 mm in adsorbent 10 is preferable because the hardness and DBL performance can be improved.

From the above, the thickness dα of the outer wall 10A in the adsorbent 10 is less than 0.6 mm. Additionally, it is preferable if the thickness dα exceeds 0.4 mm.

In Example 7, in the case where the thickness dα of the outer wall 10A is 0.42 mm, the hardness and DBL performance is generally good. In Example 7, the outer diameter D of the adsorbent 10 is 36 mm. Thus, in a relatively large adsorbent 10, the thickness dα of the outer wall 10A can be set to less than 0.45 mm. In this case, it is preferable if the thickness dα of the outer wall 10A exceeds 0.4 mm.

In Examples 11 to 13, in the case where the thickness dα of the outer wall 10A is 0.45 mm, the hardness is generally good, and the DBL performance is particularly excellent.

The thickness dβ of the ribs 10B of the adsorbent 10 can be defined similarly to the thickness dα of the outer wall 10A. In other words, the thickness dβ of the ribs 10B is at least less than 0.6 mm. Alternatively, the thickness dβ may exceed 0.4 mm.

The thickness dβ of the ribs 10B is 0.27 mm in the relatively small adsorbents 10 of Examples 1 to 6. In the relatively large adsorbents 10, the thickness dβ of the ribs 10B is 0.19 mm in Example 7 and 0.25 mm in Example 8.

In Examples 10 to 13, in which the adsorbent 10 is relatively large, the thickness dβ of the ribs 10B is 0.42 mm. In these cases, the hardness and DBL performance are generally good or particularly excellent.

In Examples 1 to 6, the outer diameter D is 6 mm, and the adsorbents are relatively small honeycomb pellets of which outer diameter D is 3.5 mm or more and 10 mm or less. In Examples 7, 8, and 10 to 13, the outer diameter D is 36 mm, and the adsorbents are relatively large honeycomb adsorbents of which outer diameter is more than 10 mm and 40 mm or less. In both the honeycomb pellets and honeycomb adsorbents, it is preferable if the thickness dα of the outer wall 10A and the thickness dβ of the ribs 10B are less than 0.6 mm and at least either of the thickness dα of the outer wall 10A and the thickness dβ of the ribs 10B exceeds 0.4 mm.

Further, the thickness dβ of the ribs 10B will be reviewed. In Examples 1 to 6, the thickness dβ of the ribs 10B is 0.27 mm, in Example 7, the thickness dβ of the ribs 10B is 0.19 mm, in Example 8, the thickness dβ of the ribs 10B is 0.25 mm, and in Examples 10 to 13, the thickness dβ of the ribs 10B is 0.42 mm. In contrast, in Comparative Examples 1 and 2, the thickness dβ of the ribs 10B is 0.44 mm, and in Comparative Example 3, the thickness dβ of the ribs 10B is 0.7 mm. As described above, the DBL performance of Comparative Examples 1 to 3 is inferior to the DBL performance of Examples 1 to 8 and 10 to 13. Thus, the thickness dβ of the ribs 10B is more preferably less than 0.44 mm and further preferably 0.3 mm or less. Also, the thickness dβ of the ribs 10B is preferably 0.15 mm or more and more preferably 0.19 mm or more. In reference to Examples 1 to 8 and 10 to 13, the thickness dβ of the ribs 10B can be appropriately adjusted at less than 0.6 mm in accordance with the shape of cells constituting the adsorbent and the amount of the crosslinking agent, inorganic material, carbonized product, metal oxide, and the like to be added.

In Example 9, the outer diameter D is 4 mm, the thickness dα of the outer wall 10A is 0.3 mm, and the thickness dβ of the ribs 10B is 0.25 mm. In Example 9, 53 g of $Fe_2O_3$ is included as the metal oxide. The amount of the metal oxide added is 38.5% by mass. The metal oxide is formed of a relatively hard inorganic material, and thus, the hardness or rigidity of the adsorbent 10 increases by inclusion of the metal oxide in the adsorbent 10. Accordingly, in Example 9, the hardness is as generally good as A. Additionally, in Example 9, the DBL performance is also as particularly excellent as AA.

In Example 2, the outer diameter D is 6 mm, the thickness dα of the outer wall 10A is 0.59 mm, the thickness dβ of the ribs 10B is 0.27 mm, and 25 g of $Fe_2O_3$ is included as the metal oxide. The amount of the metal oxide added is 25% by mass. In Example 2, the hardness is as particularly excellent as AA. Additionally, in Example 2, the DBL performance is also as particularly excellent as AA.

In Example 6, the outer diameter D is 6 mm, the thickness dα of the outer wall 10A is 0.59 mm, the thickness dβ of the ribs 10B is 0.27 mm, and 25 g of $Fe_2O_3$ is included as the metal oxide. The amount of the metal oxide added is 19.3% by mass. In Example 6, the hardness is as particularly excellent as AA. Additionally, in Example 6, the DBL performance is as generally good as A.

In Example 10, the outer diameter D is 36 mm, the thickness dα of the outer wall 10A is 0.55 mm, the thickness dβ of the ribs 10B is 0.42 mm, and 21 g of $Fe_2O_3$ is included as the metal oxide. The amount of the metal oxide added is 23.6% by mass. In Example 10, the hardness is as generally good as A, and the DBL performance is as particularly excellent as AA.

In Example 11, the outer diameter D is 36 mm, the thickness dα of the outer wall 10A is 0.45 mm, the thickness dβ of the ribs 10B is 0.42 mm, and 21 g of $Fe_2O_3$ is included as the metal oxide. The amount of the metal oxide added is 22.1% by mass. In Example 11, the hardness is as generally good as A, and the DBL performance is as particularly excellent as AA.

In Examples 12 and 13, the outer diameter D is 36 mm, the thickness dα of the outer wall 10A is 0.45 mm, the thickness dβ of the ribs 10B is 0.42 mm, and 21 g of $Fe_2O_3$ is included as the metal oxide. As the meltable cores, 6.5 g of polyethylene (PE) is included in Example 12, and 6.5 g of polymethyl methacrylate (PMMA) is included in Example 13. In Examples 12 and 13, the amount of the metal oxide added is 21.6% by mass. In Examples 12 and 13, the hardness is as generally good as A, and the DBL performance is as particularly excellent as AA.

From this, in the adsorbent 10 in which the metal oxide of 10% by mass or more and 70% by mass or less is included with respect to the adsorbent 10, the thickness dα of the outer wall and the thickness dβ of ribs can be set to less than 0.6 mm. In Example 9, the outer diameter D is 4 mm, and the adsorbent is relatively small honeycomb pellets of which outer diameter D is 3.5 mm or more and 10 mm or less. However, from a discussion in that enlarging the outer diameter D to some extent causes the number of cells of the cells 10C to be formed in the inner space to increase and the hardness or rigidity to be enhanced and thus the thickness dα of the outer wall 10A and the thickness dβ of the ribs can be made thinner, the content of the above-described metal oxide, the thickness of the outer wall doc, and the thickness dβ of the ribs can be applied to honeycomb pellets and honeycomb adsorbents having an outer diameter D of 3.5 mm or more and 40 mm or less.

A comparison is made between the adsorbent 10 of Example 9 in which rectangular-shaped cells 10C are formed and the adsorbents 10 of Comparative Examples 1 and 2 in which rectangular-shaped cells 10C are formed. While the thickness dα of the outer wall 10A is 0.3 mm in Example 9, the thickness dα of the outer wall 10A is 0.8 mm in Comparative Examples 1 and 2. Additionally, while the thickness dβ of the ribs 10B is 0.25 mm in Example 9, the thickness dβ of the ribs 10B is 0.44 mm in Comparative Examples 1 and 2. The DBL performance is as particularly poor as C in Comparative Examples 1 and 2, whereas being as particularly excellent as AA in Example 9.

In the adsorbent 10 in which the metal oxide is included at 10% by mass or more and 70% by mass or less with respect to the adsorbent 10, the thickness dα of the outer wall 10A and the thickness dβ of the ribs 10B are preferably less than 0.44 mm, more preferably 0.4 mm or less, and further preferably 0.3 mm or less.

In the adsorbent 10 in which the metal oxide is included at 10% by mass or more and 70% by mass or less with respect to the adsorbent 10, the thickness dα of the outer wall and the thickness dβ of the ribs can be 0.15 mm or more and more preferably 0.23 mm or more in consideration of a decrease in the hardness or rigidity. For example, as shown in Example 9, it is preferable that the thickness dα of the outer wall be 0.3 mm or more, and it is also preferable that the thickness dβ of the ribs is 0.25 mm or more.

In the case where the cells 10C are rectangular-shaped as in the adsorbent of Example 9, the hardness or rigidity tends to decrease in comparison with the adsorbents 10 having triangular-shaped or hexagonal-shaped cells 10C of Examples 1 to 8 and 10 to 13. However, as described above, inclusion of the metal oxide of 10% by mass or more and 70% by mass or less in the adsorbent 10 allows the hardness or rigidity of the adsorbent 10 to be enhanced.

(BWC)

In Examples 1 to 9, the BWC is 6.4 to 7.1 g/L, and in Examples 10 to 13, the BWC is 9.2 to 10 g/L. Accordingly, it is preferable that the BWC be set to more than 3.0 g/dL and 13.0 g/dL or less. In order to improve the adsorption performance, the BWC is more preferably 5.0 g/dL or more and further preferably 6.0 g/dL or more. In order to suppress degradation of the purge performance and DBL performance, the BWC is more preferably 11.0 g/dL or less.

(Purge Efficiency)

In Examples 1 to 9 and 10 to 13, the purge efficiency is 0.89 to 0.94. Accordingly, in the adsorbents 10 of Examples, the purge efficiency is preferably 0.86 or more, preferably 0.88 or more, and more preferably 0.9 or more.

(Shape of Cells, Number of Cells, and Number of Ribs)

In Examples 1 to 6, the cells 10C are triangular-shaped, and the number of cells as viewed in the axis direction is 700 cells/inch². In Examples 1 to 4, the hardness is evaluated as AA and is particularly excellent, and in Examples 5 and 6, the hardness is evaluated as A and is generally good. Additionally, in Example 1, the DBL performance is evaluated as ○ and is generally good, and in Examples 2 to 6, the DBL performance is evaluated as AA and is particularly excellent.

In Example 7, the cells 10C are hexagonal-shaped, the number of cells is 600 cells/inch², the hardness is evaluated as ○ and is generally good, and the DBL performance is evaluated as ○ and is generally good.

In Example 8, the cells 10C are hexagonal-shaped, the number of cells is 300 cells/inch², the hardness is evaluated as ○ and is generally good, and the DBL performance is evaluated as ○ and is generally good.

In Example 9, the cells 10C is rectangular-shaped, the number of cells is 600 cells/inch, the hardness is evaluated as ○ and is generally good, and the DBL performance is evaluated as AA and is particularly excellent.

In Examples 10 to 13, the cells 10C are hexagonal-shaped, the number of cells is 300 cells/inch², the hardness is evaluated as ○ and is generally good, and the DBL performance is evaluated as AA and is particularly excellent.

In contrast, in Comparative Examples 1 and 2, the cells 10C are rectangular-shaped, the number of cells is 290 cells/inch², and in Comparative Examples 1 and 2, the hardness is evaluated as ○ and is generally good, but the DBL performance is evaluated as C and is particularly poor.

In Comparative Example 3, the cells 10C are rectangular-shaped, the number of cells is 200 cells/inch², the hardness is evaluated as AA and is particularly excellent, but the DBL performance is evaluated as C and is particularly poor.

In Comparative Example 4, the cells 10C are rectangular-shaped, the number of cells are 500 cells/inch$^2$, the hardness is evaluated as C and is particularly poor, and the DBL performance is evaluated as ○ and is generally good.

In Comparative Example 5, the cells 10C are rectangular-shaped, the number of cells is 500 cells/inch$^2$, the hardness is evaluated as B and is slightly poor, and the DBL performance is also evaluated as B and is slightly poor.

Accordingly, it is preferable that the number of cells be 200 cells/inch$^2$ or more. The number of cells is more preferably 300 cells/inch$^2$ or more, more preferably 500 cells/inch$^2$ or more, more preferably 600 cells/inch$^2$ or more, and further preferably 700 cells/inch$^2$ or more.

The number of ribs will be at least 4 or more by setting the number of cells to 200 cells/inch$^2$ or more. Accordingly, it is preferable that the adsorbent 10 be formed in which the ribs 10B are formed such that the number of ribs be 4 or more in accordance with the number of cells.

In comparison of Examples 1 to 13 with Comparative Examples 1 to 5, the characteristics of Examples 1 to 13 having triangular-shaped or hexagonal-shaped cells 10C are excellent than those of the adsorbents of Comparative Examples 1 to 5 having rectangular-shaped cells 10C. In Example 9, which has rectangular-shaped cells 10C similar to those in Comparative Examples 1 to 5, the hardness is evaluated as ○ and is generally good, and the DBL performance is evaluated as AA and is particularly excellent. In Example 9, since the metal oxide is included at 10% by mass or more and 70% by mass or less with respect to the adsorbent 10, the thickness dα of the outer wall 10A can be made as small as 0.3 mm, and the thickness dβ of the ribs 10B can be made as small as 0.25 mm. It is thus considered that the purge performance, DBL performance, and the like are improved. Likewise, since the thickness dα of the outer wall 10A and the thickness dβ of the ribs 10B are small, it is considered that the adsorption performance also can be improved.

Accordingly, as the shape of cells 10C, a triangular shape or hexagonal shape is preferable. In the case where the thickness dα of the outer wall 10A and the thickness dβ of the ribs 10B can be made small while the hardness or rigidity is secured, rectangular-shaped cells 10C can be employed.

(Difference of Amount of Equilibrium Adsorption)

In Examples 1 to 9, the difference of the amount of equilibrium adsorption is 36 to 40 g/L, and the adsorption performance is high. Accordingly, it is preferable that the difference of the amount of equilibrium adsorption exceed 35 g/L. In Examples 10 to 13, the difference of the amount of equilibrium adsorption is 43 to 47 g/L, and the adsorption performance is higher. Meanwhile, the DBL performance of the adsorbents of Examples 10 to 13 is as particularly excellent as AA. Accordingly, in the adsorbents of Examples 10 to 13, the adsorption performance and purge performance are particularly improved.

(Volume of Second Pores)

In Example 5, the volume of the second pores is 0.34 mL/g with respect to the mass of the adsorbent 10, the difference of the amount of equilibrium adsorption is 36 g/L, the hardness is evaluated as ○ and is generally good, and the DBL performance is evaluated as AA and is particularly excellent. In Example 6, the volume of the second pores is 0.31 mL/g with respect to the mass of the adsorbent 10, the difference of the amount of equilibrium adsorption is 39 g/L, the hardness is evaluated as ○ and is generally good, and the DBL performance is evaluated as AA and is particularly excellent. In Examples 10 to 13, the volume of the second pores is 0.2 mL/g with respect to the mass of the adsorbent 10, the difference of the amount of equilibrium adsorption is 43 to 47 g/L, the hardness is evaluated as ○ and is generally good, and the DBL performance is evaluated as AA and is particularly excellent.

Accordingly, it is preferable that the volume of the second pores be more than 0.05 mL/g and 0.35 mL/g or less with respect to the mass of the adsorbent 10. When the pore volume of the second pores is 0.05 mL/g or less with respect to the mass of the adsorbent 10, the proportion of the paths in the adsorbent 10 is small, the desorption/adsorption rate becomes slower, and the adsorption performance and purge performance are degraded. When the pore volume of the second pores exceeds 0.35 mL/g with respect to the mass of the adsorbent 10, paths through which the evaporated fuel and purge air flow are excessively formed in the adsorbent 10, and the strength decreases. Additionally, the content of the activated carbon is lowered, and thus the BWC value decreases.

(Ratio of Metal Oxide Added)

In Example 2, 53 g of the activated carbon, 6.5 g of carboxymethyl cellulose, 1 g of the crosslinking agent, and 14.5 g of the inorganic material are included, and 25 g of the metal oxide is added. In this case, the amount of the metal oxide added is 25% by mass.

In Example 6, 53 g of the activated carbon, 6.5 g of the carboxymethyl cellulose, 25 g of the inorganic material, and 20 g of the meltable cores are included, and 25 g of the metal oxide is added. In this case, the amount of the metal oxide added is 19.3% by mass.

In Example 9, 53 g of the activated carbon, 6.5 g of the carboxymethyl cellulose, and 25 g of the inorganic material are included, and 53 g of the metal oxide is added. In this case, the amount of the metal oxide added is 38.5% by mass.

In Example 10, 41 g of the activated carbon, 6.5 g of the carboxymethyl cellulose, and 14 g of the inorganic material are included, and 21 g of the metal oxide and 6.5 g of polyethylene(PE) as the meltable cores are added. In this case, the amount of the metal oxide added is 23.6% by mass.

In Example 11, 47 g of the activated carbon, 6.5 g of the carboxymethyl cellulose, and 14 g of the inorganic material are included, and 21 g of the metal oxide and 6.5 g of polyethylene (PE) as the meltable cores are added. In this case, the amount of the metal oxide added is 22.1% by mass.

In Example 12, 49 g of the activated carbon, 6.5 g of the carboxymethyl cellulose, and 14 g of the inorganic material are included, and 21 g of the metal oxide and 6.5 g of polyethylene (PE) as the meltable cores are added. In this case, the amount of the metal oxide added is 21.6% by mass.

In Example 13, 49 g of the activated carbon, 6.5 g of the carboxymethyl cellulose, and 14 g of the inorganic material are included, and 21 g of the metal oxide and 6.5 g of polymethyl methacrylate (PMMA) as the meltable cores are added. In this case, the amount of the metal oxide added is 21.6% by mass.

From the above results, the metal oxide is preferably included at 10% by mass or more and 70% by mass or less, more preferably at 15% by mass or more and 50% by mass or less, and further preferably 19% by mass or more and 40% by mass or less, with respect to the adsorbent 10. The metal oxide has a function of enhancing the hardness or rigidity of the adsorbent 10 as well as has a function as a temperature control material. Thus, it is preferable that the ratio of the metal oxide added be determined with respect to the raw materials in consideration of a balance between both the functions.

(Ratio of Carbonized Product Added)

The ratio of the carbonized product added with respect to the raw materials is 14.5% by mass in Examples 1, 7, and 8, 4.5% by mass in Example 3, 14.5% by mass in Example 4, and 12.9% by mass in Example 5. Accordingly, the ratio of the carbonized product added with respect to the raw materials is, for example, preferably 5% by mass or more and 30% by mass or less and more preferably 10% by mass or more and 20% by mass or less, with respect to the raw materials. Addition of the carbonized product can adjust the BWC and also can enhance the hardness of the adsorbent 10.

(Ratio of Phase Change Material or Phase Transition Material Added)

The ratio of the phase change material added with respect to the activated carbon is 18.9% by mass in Example 3. The ratio of the phase transition material added with respect to the raw materials is 18.9% by mass in Example 4. Accordingly, it is preferable that the ratio of the phase change material or phase transition material added with respect to the activated carbon be 5% by mass or more and 30% by mass or less.

OTHER EMBODIMENTS

The configurations disclosed in the embodiments described above (including other embodiments; the same applies to the following) can be applied in combination with configurations disclosed in other embodiments as long as no contradiction arises. Also, the embodiments disclosed in this specification are illustrative, the embodiments of the present invention are not limited to the disclosed embodiments, and appropriate modifications can be made within a range not departing from the object of the present invention.

(1) In the above embodiment, although the adsorbent 10 for canister is provided in the atmospheric air-side adjacent region U, the following adsorbent for canister can be provided in the tank-side adjacent region T.

It is preferable that activated carbon for use in the adsorbent for canister of the modification has a BWC of 15.0 g/dL or more in a BWC evaluation method in accordance with ASTM D5228.

Then, the adsorbent includes activated carbon having a BWC of 15.0 g/dL or more in a BWC evaluation method in accordance with ASTM D5228 and an additive material, which is at least either of a phase change material having a phase change temperature of 36° C. or more and a phase transition material having a phase transition temperature of 36° C. or more.

According to the above configuration, the adsorbent for canister including an additive material such as a phase change material that absorbs and releases latent heat according to changes in temperature is provided in the tank-side adjacent region T in the adsorbent chamber R. Accordingly, temperature changes of the activated carbon can be suppressed and degradation in the performance of the activated carbon can be prevented by the adsorbent for canister.

When refueling to the fuel tank is conducted, a large amount of evaporated fuel may flow at a time into the canister 100. The evaporated fuel flowing from the tank port 23 forms an adsorption zone from the vicinity of the tank port 23 toward the atmospheric air port 25, and the temperature of the activated carbon in the adsorption zone increases due to adsorption heat. The adsorption performance of the activated carbon is markedly degraded when the temperature of the activated carbon exceeds 35° C. (about 35° C.). According to the above configuration, the tank-side adjacent region T is a region where the temperature of the activated carbon increases to 35° C. or more due to heat generated by adsorption of evaporated fuel to the activated carbon during refueling to the fuel tank, and the adsorbent including an additive material, which is at least either of a phase change material having a phase change temperature of 36° C. or more and a phase transition material having a phase transition temperature of 36° C. or more, is provided in the tank-side adjacent region T. It is therefore possible to suppress a situation in which the temperature of the activated carbon exceeds 35° C., which is preferable.

Further, since the absorbent including the activated carbon is to be provided in the tank-side adjacent region T, a reduction in the amount of activated carbon to be accommodated in the adsorbent chamber R is suppressed to thereby enable degradation in the adsorption performance to be suppressed.

(2) In the above embodiment, the contour of the adsorbent 10 is hollow cylindrical, but the contour of the adsorbent 10 is not limited thereto. The adsorbent 10 may be, for example, elliptical-shaped, long rectangular-shaped, square-shaped, or the like.

[(3) In the above embodiment, as shown in FIG. 4, the adsorbent chamber R is partitioned into three regions: the first region 31, second region 32, and third region 33. However, the region composed of the second region 32 and third region 33 may be partitioned not into two regions but into three or more regions. Also in this case, likewise, the region most adjacent to the atmospheric air port 25 is the atmospheric air-side adjacent region U, and the adsorbent 10 of the above embodiment is to be disposed in the atmospheric air-side adjacent region U.

(4) In the above embodiment, as in the canister 100 shown in FIG. 4, the adsorbent 10 of the above embodiment is to be disposed in the atmospheric air-side adjacent region U. However, the adsorbent chamber R on the side of the atmospheric air port 25 may be partitioned into a plurality of regions, and a honeycomb adsorbent and honeycomb pellets among the adsorbents 10 may be combined and disposed in each region.

Such a canister will be described hereinafter with reference to FIG. 5.

In the canister 100 of FIG. 4, the space on the right side (space on the side of the atmospheric air port 25) is divided vertically into two by the filters F, but in the canister 100 in FIG. 5, the space on the right side (space on the side of the atmospheric air port 25) is divided vertically into three by the filters F. The other constituents of the canister 100 in FIG. 5 are the same as in FIG. 4.

In this space on the side of the atmospheric air port 25, from the bottom (on the side separate from the atmospheric air port 25), the lower space (space on the side of the cover 22) is referred to as a second region 32, the middle space is referred to as a third region (atmospheric air-side separate region) 33, and the upper space (space on the side of the atmospheric air port 25) is referred to as a fourth region (atmospheric air-side adjacent region U)34. The space on the side of the tank port 23, divided by the partition wall 26, is a first region 31. In the present example, a honeycomb adsorbent having a relatively large outer diameter D and length L, among the adsorbents 10, is provided in the fourth region 34, honeycomb pellets having a relatively small outer diameter D and length L among the adsorbents 10 are provided in the third region 33, and activated carbon is provided each in the first region 31 and second region 32. For example, an adsorbent 10 having an outer diameter D of 3.5 mm or more and 10 mm or less may be referred to as a honeycomb pellet, and an adsorbent 10 having an outer diameter of more than 10 mm and 40 mm or less may be referred to as a honeycomb adsorbent.

It is preferable that the second region 32, third region 33, and fourth region 34 adjacent along the direction heading toward the atmospheric air port 25. However, a separate space may be provided at least either between the second region 32 and the third region 33 and between the third region 33 and the fourth region 34.

In the present example, in this manner, the honeycomb adsorbent among the adsorbents 10 and the honeycomb pellets among the adsorbents 10 are provided in sequence in the fourth region 34 and the third region 33, respectively.

Then, the BWC of the honeycomb pellets among the adsorbents 10 to be provided in the third region 33 and the BWC of the honeycomb adsorbent among the adsorbents 10 to be provided in the fourth region 34 become smaller in sequence. In other words, a relationship: BWC of the honeycomb pellets among the adsorbents 10 (third region 33)>BWC of the honeycomb adsorbent among the adsorbents 10 (fourth region 34) is satisfied.

As described above, in the present example, the honeycomb adsorbent among the adsorbents 10 for canister is provided in the atmospheric air-side adjacent region U as the fourth region 34, and the honeycomb pellets among the adsorbents 10 for canister are provided in the third region 33. Desorption (purge) of the evaporated fuel from the activated carbon (adsorbent body) included in the adsorbent 10 for canister is conducted by inflow of atmospheric air from the atmospheric air port 25 due to intake from the purge port 24. The above adsorbent 10 for canister is excellent in purge performance because the thickness of the outer wall 10A and ribs 10B is formed relatively thin. Accordingly, providing the above adsorbent 10 for canister in the fourth region 34, which is the atmospheric air-side adjacent region U, and in the third region 33, adjacent thereto, in the canister 100 enables the purge performance of the canister to be improved.

In the present example, particularly, even if the activated carbon provided in the second region 32 has a high BWC and a high butane adsorption performance, the honeycomb pellets and honeycomb adsorbent provided in the regions extending from the second region 32 to the atmospheric air port 25, that is, the third region 33 (atmospheric air-side separate region) 33 and the fourth region 34 (atmospheric air-side adjacent region) 34, respectively, enable the DBL performance of the canister 100 to be improved. In other words, even when the amount of butane adsorbed has increased by the activated carbon provided in the second region 32, the relatively small honeycomb pellets are provided in the third region 33, and thus, the purge performance in the third region 33 can be improved and the DBL performance of the canister 100 can be improved due to the large outer surface area of the honeycomb pellets provided in the third region 33 and the like. Additionally, since the relatively large honeycomb adsorbent is further provided in the fourth region 34 adjacent to the third region 33, adsorption of butane in the evaporated fuel purged is suppressed in the fourth region 34 to thereby enable the purge performance of the canister 100 to be improved and the DBL performance to be improved.

In the present example, particularly, the relationship: BWC of the honeycomb pellets among the adsorbents 10 (third region 33)>BWC of the honeycomb adsorbent among the adsorbents 10 (fourth region 34) is satisfied, and the BWC becomes smaller as heading toward the atmospheric air port 25. For this reason, the amount of butane remaining after purge can be smaller as heading toward the atmospheric air port 25, and thus, the performance of the DBL is improved.

A case where at least any additive material of a metal oxide, a phase change material, and a phase transition material is included in the adsorbent 10 for canister is preferable because a temperature rise and a temperature drop of the adsorbent body such as the activated carbon can be suppressed. In other words, heat is drawn when the evaporated fuel is desorbed from the adsorbent body such as the activated carbon, and thus, the temperature of the adsorbent body decreases, and the purge performance is degraded. For example, when the temperature of the activated carbon as the adsorbent body falls below 10° C., the purge performance is markedly degraded. According to the above configuration, the honeycomb adsorbent among the adsorbents 10 for canister is provided in the fourth region 34, which is the atmospheric air-side adjacent region U adjacent to the atmospheric air port 25 in the adsorbent chamber R, and the honeycomb pellets among the above adsorbents 10 for canister are provided in the third region 33 adjacent thereto the fourth region 34. Thus, an excessive drop of the temperature of the activated carbon included in the adsorbents 10 for canister is suppressed, and purge processing is appropriately conducted.

As one example, a canister 100 may be configured such that a honeycomb adsorbent, which is the adsorbent 10 of any of Examples 1 to 13, is provided in the fourth region 34, honeycomb pellets, which is the adsorbent 10 of any of Examples 1 to 13, is provided in the third region 33, and activated carbon is provided each in the other first region 31 and second region 32. Particularly, it is preferable that the honeycomb adsorbent and honeycomb pellets be composed of the adsorbent 10 of any of Examples 2 to 6, 9, and 10 to 13, in which the DBL performance is particularly excellent. It is considered that the DBL performance of such a canister 100 is evaluated as AA and is particularly excellent.

LIST OF REFERENCE SIGNS 10 adsorbent,
10A outer wall,
10B rib,
10C cell

The invention claimed is:

1. An adsorbent to be packed in a canister, comprising:
a cylindrical outer wall, and
a plurality of ribs for partitioning along an axis of the outer wall into a plurality of cells,
wherein a thickness of the outer wall and a thickness of the plurality of ribs are less than 0.6 mm, a thickness of at least either of the outer wall and the plurality of ribs exceeds 0.4 mm,
wherein an outer diameter of the outer wall is 3.5 mm or more and 40 mm or less,
wherein a butane working capacity (BWC) in a BWC evaluation method in accordance with ASTM D5228 exceeds 3.0 g/dL, and
wherein purge efficiency represented by the following equation in the BWC evaluation method in accordance with ASTM D5228 is 0.86 or more, and the purge efficiency is defined as a difference of an amount of butane adsorbed minus an amount of butane retained, with the difference divided by the amount of butane adsorbed.

2. The adsorbent according to claim 1, wherein the outer diameter of the outer wall is 3.5 mm or more and 10 mm or less.

3. The adsorbent according to claim 1, wherein the thickness of the outer wall and the thickness of the plurality of ribs is less than 0.45 mm, and the outer diameter of the outer wall is more than 10 mm and 40 mm or less.

4. An adsorbent to be packed in a canister, comprising:
a cylindrical outer wall, and
a plurality of ribs for partitioning along an axis of the outer wall into a plurality of cells,
wherein a thickness of the outer wall and a thickness of the plurality of ribs are less than 0.6 mm,
wherein an outer diameter of the outer wall is 3.5 mm or more and 40 mm or less,
wherein a metal oxide of 10% by mass or more and 70% by mass or less is included in the adsorbent with respect to the adsorbent,
wherein a butane working capacity (BWC) in a BWC evaluation method in accordance with ASTM D5228 exceeds 3.0 g/dL, and
wherein purge efficiency represented by the following equation in the BWC evaluation method in accordance with ASTM D5228 is 0.86 or more, and the purge efficiency is defined as a difference of an amount of butane adsorbed minus an amount of butane retained, with the difference divided by the amount of butane adsorbed.

5. The adsorbent according to claim 4, wherein each shape of the plurality of cells is at least either of a triangular shape and a hexagonal shape, as viewed in the axis direction.

6. The adsorbent according to claim 4, wherein a difference of an amount of equilibrium adsorption between n-butane concentrations of 5 vol % and 50 vol % exceeds 35 g/L.

7. The adsorbent according to claim 4, wherein the adsorbent is configured to include at least activated carbon and a temperature control material in which at least one of volume specific heat and thermal conductivity is higher than those of the activated carbon.

8. The adsorbent according to claim 7, wherein the temperature control material is at least any material of a metal oxide, a phase change material having a phase change temperature of 36° C. or less, and a phase transition material having a phase transition temperature of 36° C. or less.

9. The adsorbent according to claim 4, wherein:
the adsorbent is configured to include at least activated carbon, and
first pores of less than 100 nm derived from the activated carbon and second pores of 1 μm or more derived from a meltable core are formed in the adsorbent, and a volume of the second pores is more than 0.05 mL/g and 0.35 mL/g or less with respect to the mass of the adsorbent.

10. The adsorbent according to claim 4, wherein a number of cells of the plurality of cells is 200 cells/inch$^2$ or more, and a number of ribs of the plurality of ribs is 4 or more.

11. A canister for treating evaporated fuel, comprising:
a tank port in communication with an upper air chamber of a fuel tank of an internal combustion engine,
a purge port in communication with an intake path of the internal combustion engine,
an atmospheric air port to be opened to atmospheric air,
an adsorbent chamber in which the evaporated fuel flows from the tank port to the atmospheric air port, and
the adsorbent according to claim 4 at least a portion of which is arranged in an atmospheric air-side adjacent region adjacent to the atmospheric air port in the adsorbent chamber.

12. The canister according to claim 11, wherein:
a first portion of the adsorbent is arranged in the atmospheric air-side adjacent region,
a second portion of the adsorbent is arranged in an atmospheric air-side separate region more separate from the atmospheric air port than the atmospheric air-side adjacent region and adjacent to the atmospheric air-side adjacent region,
the first portion of the adsorbent in the atmospheric air-side adjacent region is a honeycomb adsorbent in which the outer diameter of the outer wall is more than 10 mm and is 40 mm or less, and
the second portion of the adsorbent in the atmospheric air-side separate region is a plurality of honeycomb pellets in which the outer diameter of the outer wall is 3.5 mm or more and is 10 mm or less.

13. The canister according to claim 12, wherein the BWC of the plurality of honeycomb pellets is greater than the BWC of the honeycomb adsorbent.

14. The canister according to claim 11, further comprising:
a second adsorbent including activated carbon having a BWC of 15.0 g/dL or more in the BWC evaluation method in accordance with ASTM D5228 and a temperature control material, which is at least one of a phase change material having a phase change temperature of 36° C. or less and a phase transition material having a phase transition temperature of 36° C. or less, wherein the second adsorbent is arranged in a tank-side adjacent region adjacent to the tank port in the adsorbent chamber.

15. A method for producing the adsorbent according to claim 4, comprising:
mixing at least activated carbon, an organic binder, a crosslinking agent, and an inorganic material, and then kneading it,
molding the kneaded material into a molded body, and
subjecting the molded body to a drying treatment at 100?C. or more and 200?C. or less.

16. A method for producing an adsorbent according to claim 4 comprising:
mixing at least activated carbon, an organic binder, and an inorganic material and then kneading it,
molding the kneaded material into a molded body, and
subjecting the molded body to a firing treatment at 700?C. or more and 900?C. or less.

17. The method for producing an adsorbent according to claim 15, wherein:
further, as a temperature control material in which at least one of volume specific heat and thermal conductivity is higher than those of the activated carbon, at least any material of a metal oxide, a phase change material having a phase change temperature of 36?C. or less, and a phase transition material having a phase transition temperature of 36?C. or less is mixed and then kneaded.

18. The method for producing an adsorbent according to claim 15, wherein a meltable core is mixed and then kneaded.

19. The method for producing an adsorbent according to claim 15, wherein, further, a metal oxide of 10% by mass or more and 70% by mass or less is mixed with respect to the adsorbent and then kneaded.

20. The adsorbent according to claim 1, wherein each shape of the plurality of cells is at least either of a triangular shape and a hexagonal shape, as viewed in the axis direction.

21. The adsorbent according to claim 1, wherein a difference of an amount of equilibrium adsorption between n-butane concentrations of 5 vol % and 50 vol % exceeds 35 g/L.

22. The adsorbent according to claim 1, wherein the adsorbent is configured to include at least activated carbon and a temperature control material in which at least one of volume specific heat and thermal conductivity is higher than those of the activated carbon.

23. The adsorbent according to claim 1, wherein the temperature control material is at least any material of a metal oxide, a phase change material having a phase change temperature of 36° C. or less, and a phase transition material having a phase transition temperature of 36° C. or less.

24. The adsorbent according to claim 1, wherein
the adsorbent is configured to include at least activated carbon,
first pores of less than 100 nm derived from the activated carbon and second pores of 1 μm or more derived from a meltable core are formed in the adsorbent, and a volume of the second pores is more than 0.05 mL/g and 0.35 mL/g or less with respect to the mass of the adsorbent.

25. The adsorbent according to claim 1, wherein a number of cells of the plurality of cells is 200 cells/inch$^2$ or more, and a number of ribs of the plurality of ribs is 4 or more.

26. A canister for treating evaporated fuel, comprising:
a tank port in communication with an upper air chamber of a fuel tank of an internal combustion engine,
a purge port in communication with an intake path of the internal combustion engine,
an atmospheric air port to be opened to atmospheric air,
an adsorbent chamber in which the evaporated fuel flows from the tank port to the atmospheric air port, and
the adsorbent according to claim 1 at least a portion of which is arranged in an atmospheric air-side adjacent region adjacent to the atmospheric air port in the adsorbent chamber.

27. The canister according to claim 26, wherein:
a first portion of the adsorbent is arranged in the atmospheric air-side adjacent region,
a second portion of the adsorbent is arranged in an atmospheric air-side separate region more separate from the atmospheric air port than the atmospheric air-side adjacent region and adjacent to the atmospheric air-side adjacent region,
the first portion of the adsorbent in the atmospheric air-side adjacent region is a honeycomb adsorbent in which the outer diameter of the outer wall is more than 10 mm and is 40 mm or less, and
the second portion of the adsorbent provided in the atmospheric air-side separate region is a plurality of honeycomb pellets in which the outer diameter of the outer wall is 3.5 mm or more and is 10 mm or less.

28. The canister according to claim 27, wherein the BWC of the plurality of honeycomb pellets is greater than the BWC of the honeycomb adsorbent.

29. The canister according to claim 28, further comprising:
a second adsorbent including activated carbon having a BWC of 15.0 g/dL or more in the BWC evaluation method in accordance with ASTM D5228 and a temperature control material, which is at least one of a phase change material having a phase change temperature of 36° C. or less and a phase transition material having a phase transition temperature of 36° C. or less, wherein the second adsorbent is arranged in a tank-side adjacent region adjacent to the tank port in the adsorbent chamber.

30. A method for producing the adsorbent according to claim 1, comprising:
mixing at least activated carbon, an organic binder, a crosslinking agent, and an inorganic material, and then kneading it,
molding the kneaded material into a molded body, and
subjecting the molded body to a drying treatment at 100?C. or more and 200?C. or less.

31. A method for producing an adsorbent according to claim 1 comprising:
mixing at least activated carbon, an organic binder, and an inorganic material and then kneading it,
molding the kneaded material into a molded body, and
subjecting the molded body to a firing treatment at 700?C. or more and 900?C. or less.

32. The method for producing an adsorbent according to claim 30, wherein:
further, as a temperature control material in which at least one of volume specific heat and thermal conductivity is higher than those of the activated carbon, at least any material of a metal oxide, a phase change material having a phase change temperature of 36?C. or less, and a phase transition material having a phase transition temperature of 36?C. or less is mixed and then kneaded.

33. The method for producing an adsorbent according to claim 30, wherein a meltable core is mixed and then kneaded.

34. The method for producing an adsorbent according to claim 30, wherein, further, a metal oxide of 10% by mass or more and 70% by mass or less is mixed with respect to the adsorbent and then kneaded.

35. The method for producing an adsorbent according to claim 31, wherein:
further, as a temperature control material in which at least one of volume specific heat and thermal conductivity is higher than those of the activated carbon, at least any material of a metal oxide, a phase change material having a phase change temperature of 36?C. or less, and a phase transition material having a phase transition temperature of 36?C. or less is mixed and then kneaded.

* * * * *